(12) United States Patent
Rodriguez et al.

(10) Patent No.: US 9,524,753 B2
(45) Date of Patent: Dec. 20, 2016

(54) TELEPROMPTER TOOL FOR VOICE-OVER TOOL

(71) Applicant: Apple Inc., Cupertino, CA (US)

(72) Inventors: Enrique Rodriguez, San Jose, CA (US); Fernando Garcia, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 151 days.

(21) Appl. No.: 14/264,008

(22) Filed: Apr. 28, 2014

(65) Prior Publication Data
US 2014/0328575 A1 Nov. 6, 2014

Related U.S. Application Data

(63) Continuation of application No. 12/852,382, filed on Aug. 6, 2010, now Pat. No. 8,744,239.

(51) Int. Cl.
| | |
|---|---|
| *G11B 27/036* | (2006.01) |
| *G11B 27/034* | (2006.01) |
| *G11B 27/34* | (2006.01) |
| *G11B 27/031* | (2006.01) |
| *H04N 9/802* | (2006.01) |

(52) U.S. Cl.
CPC ........... *G11B 27/036* (2013.01); *G11B 27/031* (2013.01); *G11B 27/034* (2013.01); *G11B 27/34* (2013.01); *H04N 9/802* (2013.01)

(58) Field of Classification Search
CPC ... G06F 17/30796; H04N 5/772; H04N 5/781; H04N 21/4334
See application file for complete search history.

(56) References Cited

U.S. PATENT DOCUMENTS

| | | |
|---|---|---|
| 5,583,980 A | 12/1996 | Anderson |
| 5,600,775 A | 2/1997 | King et al. |
| 5,760,767 A | 6/1998 | Shore et al. |
| 6,226,615 B1 | 5/2001 | Kirby et al. |
| 6,404,978 B1 | 6/2002 | Abe |
| 6,442,517 B1 * | 8/2002 | Miller ............... G10L 19/167 370/493 |
| 6,546,188 B1 | 4/2003 | Ishii et al. |
| 7,111,230 B2 | 9/2006 | Euchner et al. |
| 7,366,979 B2 | 4/2008 | Spielberg et al. |
| 7,559,017 B2 | 7/2009 | Datar et al. |
| 7,592,532 B2 | 9/2009 | Coleman |
| 8,064,753 B2 | 11/2011 | Freeman |

(Continued)

FOREIGN PATENT DOCUMENTS

WO  WO 2009/026159  2/2009

*Primary Examiner* — Huy T Nguyen
(74) *Attorney, Agent, or Firm* — Adeli LLP

(57) ABSTRACT

Some embodiments provide a method for a media editing application that creates a composite presentation from several different media clips. The method provides a set of editing tools for editing the composite presentation. The method provides a voice-over tool for receiving text for a voice-over that includes a transcript for a voice-over audio clip to be recorded by the media editing application as a clip of the composite presentation. The method provides a display area for scrolling the text when recording the voice-over audio clip. The display area in some embodiments is a preview display area that scrolls the text while displaying a preview of the composite presentation when recording the voice-over audio clip.

18 Claims, 23 Drawing Sheets

(56) References Cited

U.S. PATENT DOCUMENTS

| | | |
|---|---|---|
| 8,744,239 B2 | 6/2014 | Rodriguez et al. |
| 2001/0040592 A1 | 11/2001 | Foreman et al. |
| 2003/0049015 A1 | 3/2003 | Cote et al. |
| 2003/0117431 A1 | 6/2003 | Moriwake et al. |
| 2003/0164924 A1 | 9/2003 | Sherman et al. |
| 2004/0090462 A1 | 5/2004 | Graham |
| 2004/0205515 A1 | 10/2004 | Socolow et al. |
| 2005/0042591 A1 | 2/2005 | Bloom et al. |
| 2005/0132293 A1 | 6/2005 | Herberger et al. |
| 2005/0278759 A1 | 12/2005 | Unger |
| 2007/0136656 A1 | 6/2007 | Nydam et al. |
| 2007/0239883 A1 | 10/2007 | Glenn |
| 2007/0260968 A1 | 11/2007 | Howard et al. |
| 2007/0266304 A1 | 11/2007 | Fletcher et al. |
| 2008/0002949 A1 | 1/2008 | Tokunaka et al. |
| 2008/0077866 A1 | 3/2008 | Margulis |
| 2008/0115063 A1 | 5/2008 | Glenn |
| 2008/0292265 A1 | 11/2008 | Worthen |
| 2009/0237422 A1 | 9/2009 | Modi et al. |
| 2009/0327856 A1 | 12/2009 | Mouilleseaux et al. |
| 2010/0094689 A1 | 4/2010 | Fodor |
| 2010/0293465 A1 * | 11/2010 | Kleinschmidt ... G06F 17/30796 715/719 |

* cited by examiner

TELEPROMPTER TOOL FOR VOICE-OVER TOOL

CLAIM OF BENEFIT TO PRIOR APPLICATIONS

This Application is a continuation application of U.S. patent application Ser. No. 12/852,382, filed Aug. 6, 2010, now published as U.S. Patent Publication 2012/0033948. U.S. patent application Ser. No. 12/852,382, now published as U.S. Patent Publication 2012/0033948, is incorporated herein by reference.

BACKGROUND

To date, many media editing applications exist for creating media presentations by compositing several pieces of media content such as video, audio, animation, still image, etc. Such applications give users the ability to edit, combine, transition, overlay, and piece together different media content in a variety of manners to create a resulting composite presentation. Examples of media editing applications include Final Cut Pro® and iMovie®, both sold by Apple Inc.

Some media editing applications provide editing tools for adding voice-over content to a presentation. Such voice-over content provides audiences with insight (e.g., narration, translation, off screen commentary) for other video and/or audio content in the presentation. Typically, a voice-over clip is produced by recording the voice of a narrator or actor reading aloud a prepared script through a microphone. The narrator may read the script from a printed document or a monitor that displays the script. Once the voice-over clip is produced, a content editor may import the voice-over clip and perform various other editing operations to incorporate the clip into the presentation.

To facilitate voice-over clip creation, a media editing application may include an audio recording feature. With such a media editing application, the narrator (that may also be the content editor) typically launches a separate text editing application to display a text document containing a script. The narrator then reads the script into a microphone while recording his or her voice using the media editing application.

There are a number shortcomings with the approaches mentioned above. For instance, in creating a voice-over clip, a narrator performs take after take (i.e., read a same script multiple times) in order to match the timing of a voice-over with other video clip and/or audio clip in a composite presentation. Also, launching a separate text editing application (e.g., Text Edit, Pages) to display a script causes the operating system's user interface to be cluttered with various user interface windows (e.g., the media editing application, a document reader, an audio recorder, etc.) making it difficult to read the script. Furthermore, reading a script from a printed document or a separate text editing application fails to correlate the scripted words with a composite content that is being produced.

BRIEF SUMMARY

For a media-editing application that creates composite presentations, some embodiments of the invention provide a novel teleprompter tool for displaying voice-over text when recording a voice-over clip for a composite presentation. The media editing application of some embodiments includes (1) a text area for receiving a script to record the voice-over clip and (2) an output display area for displaying the script when recording the voice-over clip. In some embodiments, the output display area is a preview display area that displays both the script and a preview of the composite presentation during the recording session. This allows a narrator to watch the preview and read the script at the same time in order to match the timing of the voice-over with the displayed preview.

In some embodiments, the media editing application receives a script for a voice-over in a number of different ways. For instance, the application's user can type the script and/or copy and paste it directly into the text area. Alternatively or conjunctively, text contained in one or more files (e.g., text file, word document) can be imported into the text area. To facilitate import operations, some embodiments provide a set of import tools to select one or more files that contains text. Once selected, the media editing application then extracts text contained in each selected file and populate the text area with the extracted text.

The media editing application in some embodiments display a script for a voice-over clip by scrolling the script in the output display area over a set time duration. For instance, the script may be scrolled in the display area such that the first line of the script appears in the display area just as the duration begins and the last line of the script disappears just as the duration ends. In some embodiments, the media editing application provides several different user adjustable items (e.g., a slider control) to specify the scrolling speed of output text.

Based on input text for a voice-over clip, some embodiments automatically calculate an estimated duration for reading the input text. In some embodiments, the estimation is based on a time that an average speaker takes to read aloud a given number of words (e.g., one or more words) multiplied by the number words in the text area. Different embodiments of the invention compute this estimation differently. For instance, the media editing application may count the number of letters, syllables (e.g., combination of consonants and vowels), words, and/or any combination of these variables; and calculate the estimated time duration.

In some embodiments, the media editing application includes a composite display area for displaying media clips that are part of a composite presentation. To display one or more real-time timing references (e.g., in such a composite display area), some embodiments calculate the estimated duration in the background. For instance, when the composite display area includes a timeline and one or more tracks that span the timeline for holding one or more media clips, an in point timing reference and out point timing reference that represent start and end points of the voice-over clip may be displayed along the timeline. This allow a user of the media editing application to visualize the timing of the voice-over clip with respect to other clips in the composite presentation prior to recording the voice-over clip.

In some embodiments, the teleprompter tool includes a variety of different user interface controls to match the timing of a voice-over clip with one or more other clips (e.g., video clip, audio clip) prior to recording the voice-over clip. One such control is a speech rate controller that controls the rate at which output text is presented in a display area. In some embodiments, the speech rate defines the scrolling speed of output text as mentioned above. By setting the speech rate (e.g., anywhere along a defined range), a user can customize the scrolling speed of the output text to match the natural speech rate of a narrator reading the voice-over script.

To facilitate timing operations, some embodiments provide a duration control that allows a user to specify a duration for a voice-over clip. For instance, when only a particular time duration (e.g., 10 seconds) is available for the voice-over clip, the user can use this control to granularly adjust the voice-over clip's duration to match the particular time duration. In some embodiments, an adjustment to the duration automatically modifies the speech rate. For instance, when less time is available for a voice-over clip, the media editing application might automatically increase the speech rate to accelerate the presentation of output text in the display area. Conversely, when more time is available, the speech rate may be decreased to give a narrator more time to read a script.

By allowing a user to perform several different timing operations prior to recording the voice-over clip, the media editing application in some embodiments prevents multiple takes being performed on one script in order to match the timing of a voice-over clip with another clip in a composite presentation. Modifying the speech rate, scroll rate, and duration are just three examples of different timing operations that can be performed prior to recording the voice-over clip. Alternatively, or conjunctively, some embodiments provide several other controls to perform different timing operations. For instance, the media editing application in some embodiments provides several user selectable items for matching a starting point or an ending point of a voice-over clip with another clip (e.g., video clip, audio clip) in a composite presentation.

The teleprompter tool in some embodiments is a part of a voice-over tool for recording voice-over. In some embodiments, the voice-over tool includes its own display area that acts as a teleprompter during the recording session. Instead of the voice-over tool's display area, or in conjunction with it, some embodiments allow the application's user to specify a destination output display area (e.g., a preview display area in which the voice-over text is displayed on top of the video). In some embodiments, the specified display area is not a display area of the media editing application but a remote display of a client device. This allows a composite presentation to be created at a separate physical location from where the voice-over audio data is actually recorded or transmitted (e.g., across a network) to be recorded.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
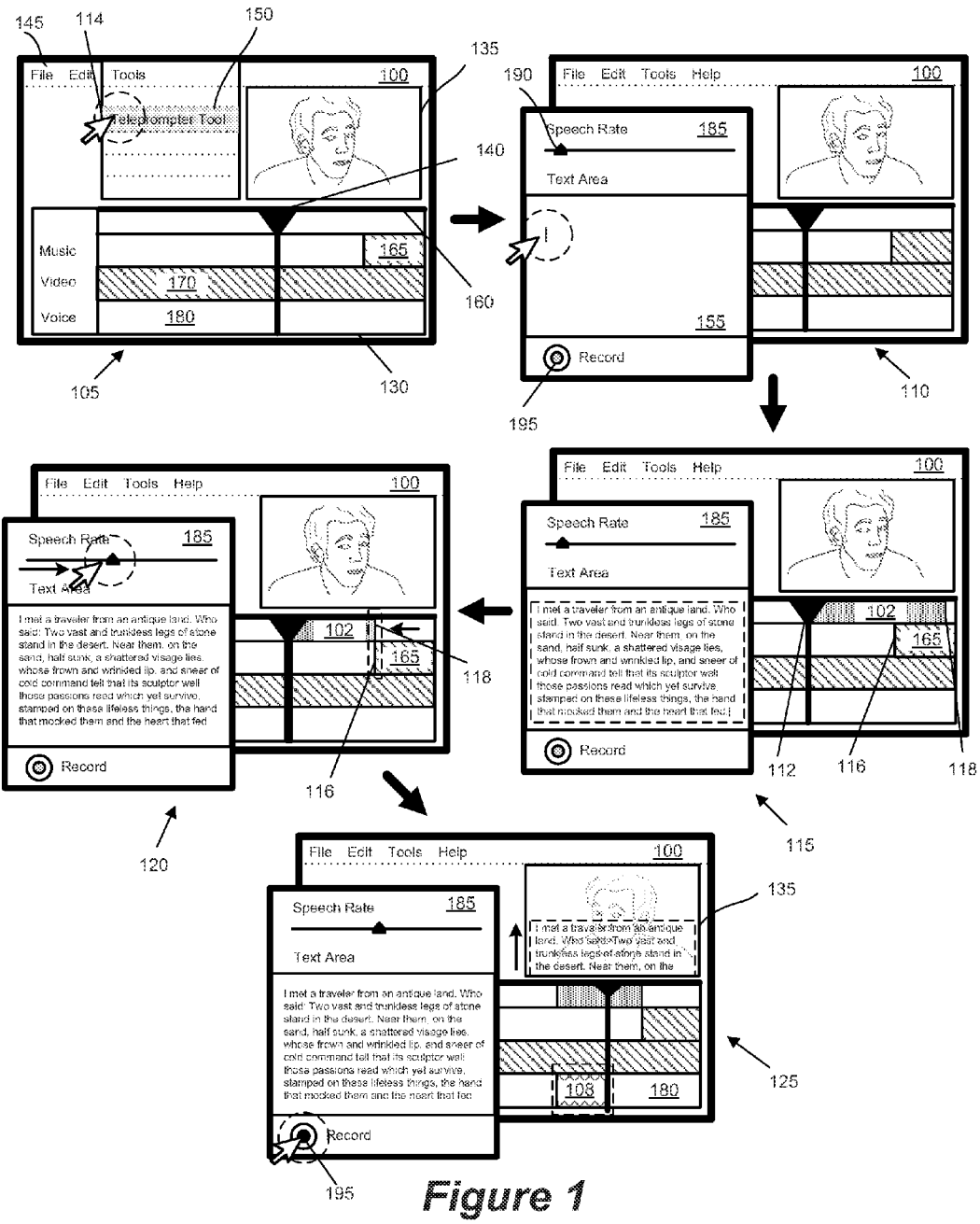
FIG. 1 illustrates a graphical user interface ("GUI") of a media editing application with the teleprompter tool.

For a media-editing application that creates composite presentations, some embodiments of the invention provide a novel teleprompter tool for displaying voice-over text when recording a voice-over clip for a composite presentation. The media editing application of some embodiments includes (1) a text area for receiving a script to record the voice-over clip and (2) an output display area for displaying the script when recording the voice-over clip. For some embodiments of the invention, FIG. 1 illustrates a graphical user interface ("GUI") 100 of a media editing application with such a teleprompter tool 185. This figure illustrates the GUI 100 at five different stages 105, 110, 115, 120, and 125. In particular, these stages show how the teleprompter tool 185 can be used to create a voice-over content for a composite presentation. Each of these stages will be described in detail below after an introduction of the elements of GUI 100.

As shown in FIG. 1, the GUI 100 includes a composite display area 130, a preview display area 135, a playhead 140, a menu bar 145, and the teleprompter tool 185. The composite display area 130 includes multiple tracks that span a timeline 160, and displays one or more graphical representations of media clips in the composite presentation. As shown, the composite display area 130 displays a music clip representation 165 and a video clip representation 170. The composite display area 130 also includes a track 180 (that is empty in stages 105-120) for displaying a voice-over clip representation 108.

The preview display area 135 displays a preview of a composite presentation that the application creates by compositing several media clips. To select a starting point for the preview, a user of the media editing application can drag the playhead 140 to different positions along the timeline 160. The user can then select a play button (not shown) to play the preview starting from the time in the composite presentation corresponding to the position of the playhead. In some embodiments, the playhead can also be used to specify or highlight an instance or segment of time in the composite presentation. For instance, in some such embodiments, the playhead can be used to specify an insertion point (i.e., starting point) for a voice-over clip to be recorded.

The menu bar 145 provides several grouped sets of menu commands and options for the media editing application. A user's selection of the "tools" menu causes the GUI 100 to reveal (e.g., drag down) several editing tools that includes a teleprompter tool menu item 150. The selection of the menu item 150 causes the teleprompter tool 185 to appear.

The teleprompter tool 185 allows a user to record a voice-over clip for a composite presentation using the teleprompter functionality provided by the media editing application. As show in FIG. 1, the teleprompter tool includes a text area 155, a speech rate controller 190, and a record button 195.

The text area 155 is an area of the teleprompter tool 185 for receiving input text (e.g., a voice-over script). The text area 155 may receive input in a number of different ways. For instance, the text area 155 may receive input text by a user typing and/or copying and pasting a script directly into the text area. Alternatively or conjunctively, text contained in one or more files (e.g., text file, word document) may be imported into the text area 155.

The speech rate controller 190 determines the rate at which output text is presented in an output display area (e.g., the preview display area 135) for a narrator to read. By setting the speech rate (e.g., anywhere along a defined range), a user can customize the speech rate to match the natural speaking rate of a narrator. The user can also modify the speech rate to match the timing of a voice-over clip with another clip in the composite presentation. For instance, an ending point of a voice-over clip can be matched with a starting point of another audio clip by increasing or decreasing the speech rate as more or less time will be available for a narrator to read a script at the specified rate.

In some embodiments, text input in the text area 155 scrolls as output text in an output display area based on the speech rate setting. For instance, when the speech rate is adjusted from a lower setting to a higher setting, the output text may scroll faster in the output display area. Conversely, when the speech rate is adjusted from a higher setting to a lower setting, the output text may scroll more slowly. In the example illustrated in FIG. 1, the speech rate controller 190 is an adjustable slider. However, other types of user interface controls (e.g., dial knob, buttons), key strokes, and/or hot-keys may be provided to control the speech rate.

The record button 195 is used to start the audio recording. In some embodiments, when the text area 155 includes input text, a user's selection of the record button 195 also causes the input text to be displayed in an output display area such as the preview display area 135. In some embodiments, an initial selection of the record button 195 starts the recording session and a subsequent selection stops or pauses the recording session.

Having described the elements of the GUI 100, the operation will now be described by reference to the state of this GUI during the five stages 105, 110, 115, 120, and 125 that are illustrated in FIG. 1. In the first stage 105, the composite display area 130 displays a composite representation (a representation of the composite presentation that the user is editing) that includes several clip representations (i.e., 165 and 170) that span along the timeline 160. A user or content editor might have added these clips to the composite representation in a current editing session or by opening a composite project (alternatively referred to as a "project") that was defined in a previous editing session.

In the first stage 105, the user has specified a starting location for a voice-over clip by moving the playhead 140 (e.g., through a cursor click and drag operation) to its current position. The teleprompter tool 185 has not yet been activated. However, the user has selected the "tools" menu of the menu bar 145 which causes the teleprompter tool menu item 150 to be revealed. To activate the teleprompter tool 185, a cursor 114 is placed over the teleprompter tool menu item 150. One of ordinary skill will recognize that different embodiments provide different user interface items to activate the teleprompter tool 185 (e.g., selectable button, etc.).

The second stage 110 shows the GUI 100 after the user's selection of the teleprompter tool menu item 150 through the cursor 114. As shown, the selection causes the teleprompter tool 185 to appear. In this stage, the user has selected the text area 155 with the cursor 114 in order to input text (e.g., a voice-over script).

The third stage 115 shows the GUI 100 after the user inputs text into the text area 155. When the text area 155 receives text, some embodiments determine an estimated time that it would take for a narrator to read aloud the input text. In some embodiments, the estimation is based on a time that an average speaker takes to read aloud a given number of words (e.g., one or more words) multiplied by the number words in the text area 155. Different embodiments of the invention compute this estimation differently. For instance, the media editing application may count the number of letters, syllables (e.g., combination of consonants and vowels), words, and/or any combination of these variables; and calculate the estimated time duration.

In some embodiments, the estimated duration is computed in the background to provide a real-time timing reference for a voice-over clip. For instance, the media editing application may calculate the estimated duration as the user types or inputs a script into the text area 155. This is illustrated in the third stage 115 as the text input causes the composite display area 130 to display a voice-over clip indication 102 that provides a timing reference for a voice-over clip to be recorded.

As shown in the third stage 115, the voice-over clip indication 102 is displayed along the timeline 160 of the composite display area 130. Specifically, the voice-over clip indication 102 expands across the timeline 160 starting from an in point 112 to an out point 118. The in point corresponds to a position of the playhead 140 or, as mentioned above, the user-specified starting point for the voice-over clip. Based on the text input, the out point 118 is positioned along the timeline 160 at a location corresponding to a time when the voice-over clip is predicted to end. The distance between the in point 112 and the out point 118 corresponds to the time estimated for recording the text inputted into the text area 155. In the example illustrated in FIG. 1, a horizontal bar extends across the distance between the two points 112 and 118 to allow a user to visualize the timing of the voice-over clip with respect to other clip representation in the composite display area 130.

In the third stage 115, as the text is inputted, the voice-over clip indication expands along the timeline such that the indication's out point 118 moves past an in point 116 of the music clip representation 165. This indicates to a user that the timing of the voice-over clip may not match the timing of the music clip in the composite presentation. Specifically, the juxtaposition of the voice-over clip indication 102 and the music clip representation 165 along the timeline 160 allows the user to see that the timing of the voice-over clip collides with the timing of the music clip.

The fourth stage 120 shows an adjustment of the speech rate controller 190 to match the timing of the voice-over clip with the music clip. Specifically, the user selects and moves a knob of the speech rate controller 190 from a first location representing a normal speech rate setting to a second location representing a faster speech rate setting.

To account for a change in the speech rate setting, some embodiments recalculate the estimated duration computed for a voice clip. In some embodiments, the estimated duration is multiplied by a value associated with the speech rate setting in order to derive a new estimate. For instance, when the speech rate setting changes from a normal speed to a double speed, the estimated duration might be multiplied by ½ to account for the change. Similarly, when the speech rate setting changes from the normal speed to half speed, the estimated duration might be multiplied by 2.

By associating the speech rate setting with the estimated duration, some embodiments allow timing operations to be performed with the speech rate controller 190. As mentioned above, the distance between the in point 112 and the out point 118 of the voice-over clip indication 102 corresponds to the time estimated for recording the text inputted into the text area 155. In the fourth stage 120, the adjustment of the speech rate controller 190 to the faster speech rate setting causes the estimated duration to be recalculated. As the faster speech rate setting reduces the estimated duration, the out point 118 of the voice indications moves along the timeline towards the in point 112. Specifically, in stage fourth stage 120, the user performs a timing matching operation by adjusting the speech rate controller 190 such that the out point 118 of the voice-over clip indication 102 is aligned with the in point 116 of the music clip representation 165. Some embodiments allow the user to select and move an in point and/or out point of the voice-over clip indication to set a particular duration for a voice-over clip. In some such embodiments, the movement causes the speech rate setting to be adjusted correspondingly.

The fifth stage 125 illustrates the GUI 100 after the user's selection of the record button 195. The selection causes the media editing application to record the voice-over clip by capturing audio data spoken through a microphone (not shown). The selection also causes the preview display area 135 to display the script and a preview of the composite presentation at the same time. Specifically, the preview display area displays the input text by scrolling the text vertically over the preview.

In the fifth stage 125, as the recording time elapse, the playhead 140 moves horizontally along the timeline 160. In some embodiments, a voice representation 108 fills up the track 180 to provide the user with a visual indication of the duration of the recorded voice-over clip. At any time, the user can stop or pause the recording of the voice-over clip and the scrolling of the output text by reselecting the record button 195, or a pause or stop button (not shown). In some embodiments, when an end point of the estimated time duration is reached, the media editing application automatically stops the recording of the voice-over clip. Alternatively, the media editing application may continue recording but stop when directed to by the application's user.

In the example illustrated in stage five 125, the preview display area acts as the teleprompter for displaying the script. This prevents the operating system from becoming cluttered with various different windows as a separate application does not have to be opened to display the script. In addition, this allows a narrator to watch the preview of a presentation and read the script at the same time in order to match the timing of a voice-over with the displayed preview. As will be described in detail below, alternatively or conjunctively, the input text may be outputted to one or more other display areas. Also, in FIG. 1, the teleprompter tool 185 is displayed in a window separate from the GUI 100. However, the teleprompter tool 185 may be displayed as a child window of the GUI 100 in some embodiments.

Several more detailed example operations of the teleprompter tool are described below. However, before describing these examples, an exemplary media editing application that implements the teleprompter tool of some embodiments will be described below in Section I. Section II then describes several examples timing operations that can be performed with the teleprompter tool prior to recording a voice-over clip. Section III then describes several recording operations. Section IV follows that discussion with an example process for displaying timing references for a voice-over clip. Section IV also describes an example process for scrolling text in an output display area. Section V follows that discussion with a description of software modules used to implement some embodiments of the media editing application. Lastly, Section VI describes a computer system which implements some embodiments of the invention.

I. Media Editing Application with Voice-Over Tool

A. Media Editing Application

Figure 2:
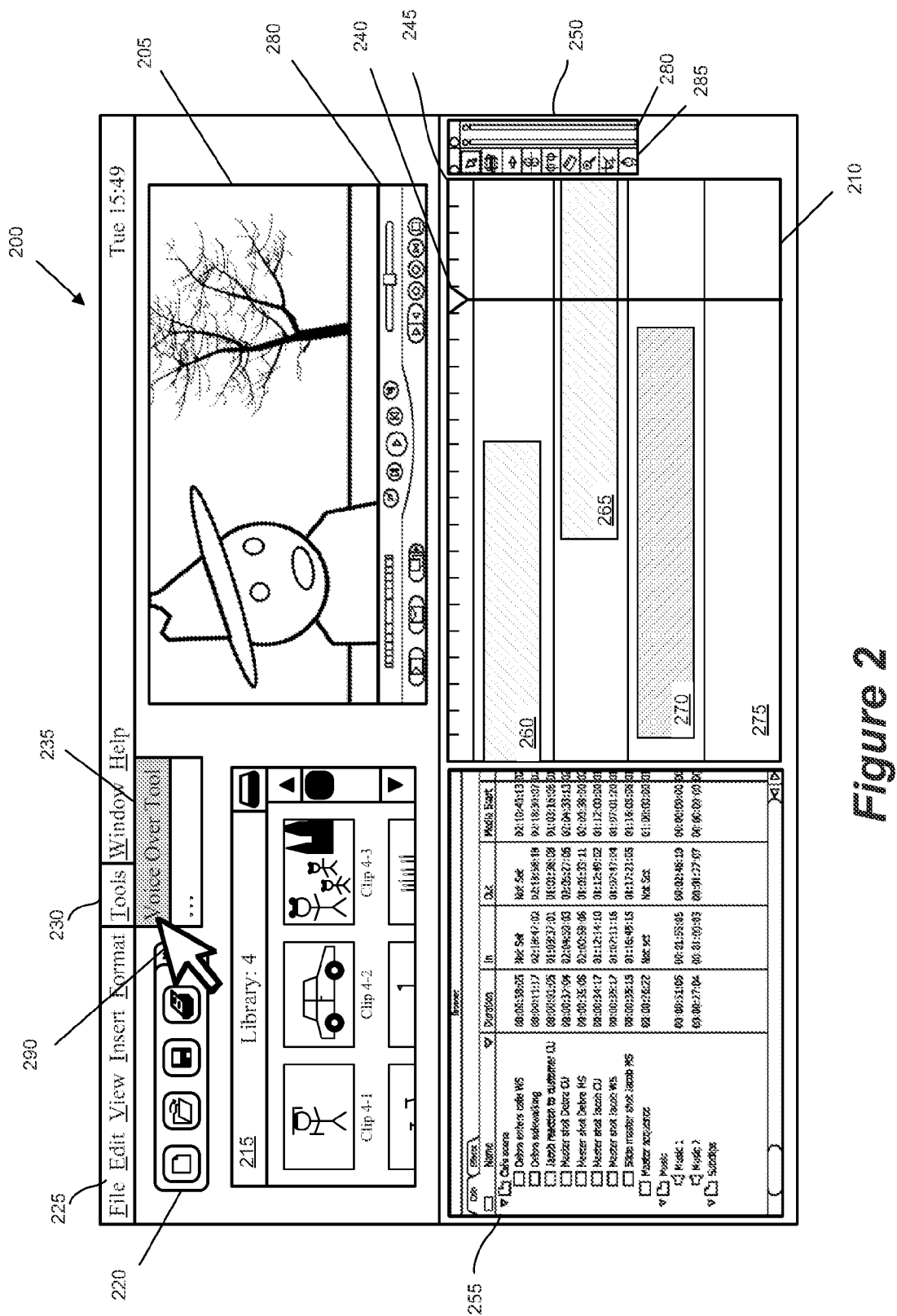
FIG. 2 illustrates an example media editing application that implements the teleprompter tool.

For some embodiments of the invention, FIG. 2 illustrates a GUI 200 of a media editing application that implements the teleprompter tool. Specifically, this figure illustrates one example layout of various components included in the media editing application. As shown in FIG. 2, the GUI 200 includes a preview display area 205, a composite display area 210, a playhead 240, a toolbar 250, a menu bar 225, shortcut menu bar 220, a media library 215, and a browser window 255.

The preview display area 205 displays a preview of a composite presentation that the media editing application creates by compositing several media clips (e.g., audio clip, video). The media library 215 is an area in the GUI 200 through which the application's user can select media clips to add to a presentation that the user is compositing with the application. In the example of FIG. 2, the clips in the media library are represented as thumbnails that can be selected and added to the composite display area 210 (e.g., through a drag-and-drop operation or a menu selection operation). The clips in the media library may also be represented as a list, a set of icons, or some other representation that allows a user to view and select (e.g., through a cursor click operation, a touch operation, etc.) the various clips in the library. In some embodiments, the media library 215 may include audio clips, video clips, text overlays, pictures, and/or other media. The media library 215 may provide access to media that is stored locally or at a central location (e.g., a location accessed through a network). In some embodiments media content may be selected from locations outside the media library 215 or the GUI 200. For instance, in some embodiments a user selects media clips using other techniques (e.g., by using menu commands provided by the menu bar 225, by dragging one or more media clips from an open folder, etc.).

The composite display area 210 displays one or more media clips that are part of the composite presentation. In some embodiments, the composite display area 210 is an area in the GUI 200 that includes multiple tracks (e.g., track 275) that span a timeline 245. One or more media clips (e.g., clip representations 260-270) can be represented or placed on each track. In the example of FIG. 2, the composite display area 210 also includes a track 275 for displaying a voice-over clip representation. However, the voice-over clip representation (e.g., a generic audio track) may be displayed along one of the other tracks with one or more other clip representations.

The playhead 240 is for highlighting an instance in time in the composite representation (a representation of the composite presentation that the user is editing) that is being shown in the composite display area 210. Highlighting this instance in time is useful for a variety of reasons. For example, when viewing a preview of the composite presentation in the preview display area 205, the playhead 240 scrolls across the timeline 245 to identify the location in the composite representation in the composite display area 210 that is being currently displayed in the preview display area 205. In addition, the location of the playhead 240 also acts as an insertion point when adding clips (e.g., voice-over clip), effects, or other media to the project.

The toolbar 250 includes various buttons 280 and controls 285. These various buttons and controls are conceptual representations of UI items that allow the user to select, adjust, and/or control various aspects of the composite presentation that the media editing application creates (e.g., by selecting various options, executing various commands, specifying the values of certain parameters, etc.). In some embodiments, the toolbar includes various different controls to edit the composite presentation (e.g., by inserting clips, superimposing an image, shorten, or extend a clip, etc). As one example, the toolbar may include a set of trim tools for modifying in and out points of media clips of a composite presentation in a variety of manners.

The menu bar 225 provides several grouped sets of menu commands and options for the media editing application. One such option is tools menu 230 which when selected displays a list of selectable tools that includes a voice-over tool menu item 235. In some embodiments, the shortcut menu bar 220 displays several icons that represent selectable items in menu bar 225. As such, the voice-over tool menu item 235 may be represented as a selectable icon in the shortcut menu bar 220. Alternatively or conjunctively, the voice-over tool menu item 235 may be represented in another display area of the GUI 200 (e.g., in the toolbar 250).

In some embodiments, the browser window 255 includes a list of video clips along with metadata (e.g., timecode information) about the video clips. In some embodiments, the list of video clips is the list of video clips in a particular sequence of video clips, and the metadata specifies in and out points, durations, etc. for the video clips. In the example illustrated in FIG. 2, the browser window is displayed as a child window of the GUI 200; however, the browser window may alternatively be displayed in a window that is separate from the GUI 200. When the browser window is displayed separately, the browser window and GUI may conjunctively perform various operations (e.g., modifications to items in the browser window may affect the display of the GUI 200, the data included in a composite project that is active in the GUI 200, etc.).

As shown in FIG. 2, a selection of the "tools" menu 230 with a cursor 290 causes the GUI 200 to displays a list of tools. The list of tool includes voice-over tool menu item 235 for opening the voice-over tool. The cursor 290 is placed over the voice-over tool menu item 235 in order to open the voice-over tool.

B. Voice-Over Tool

Figure 3:
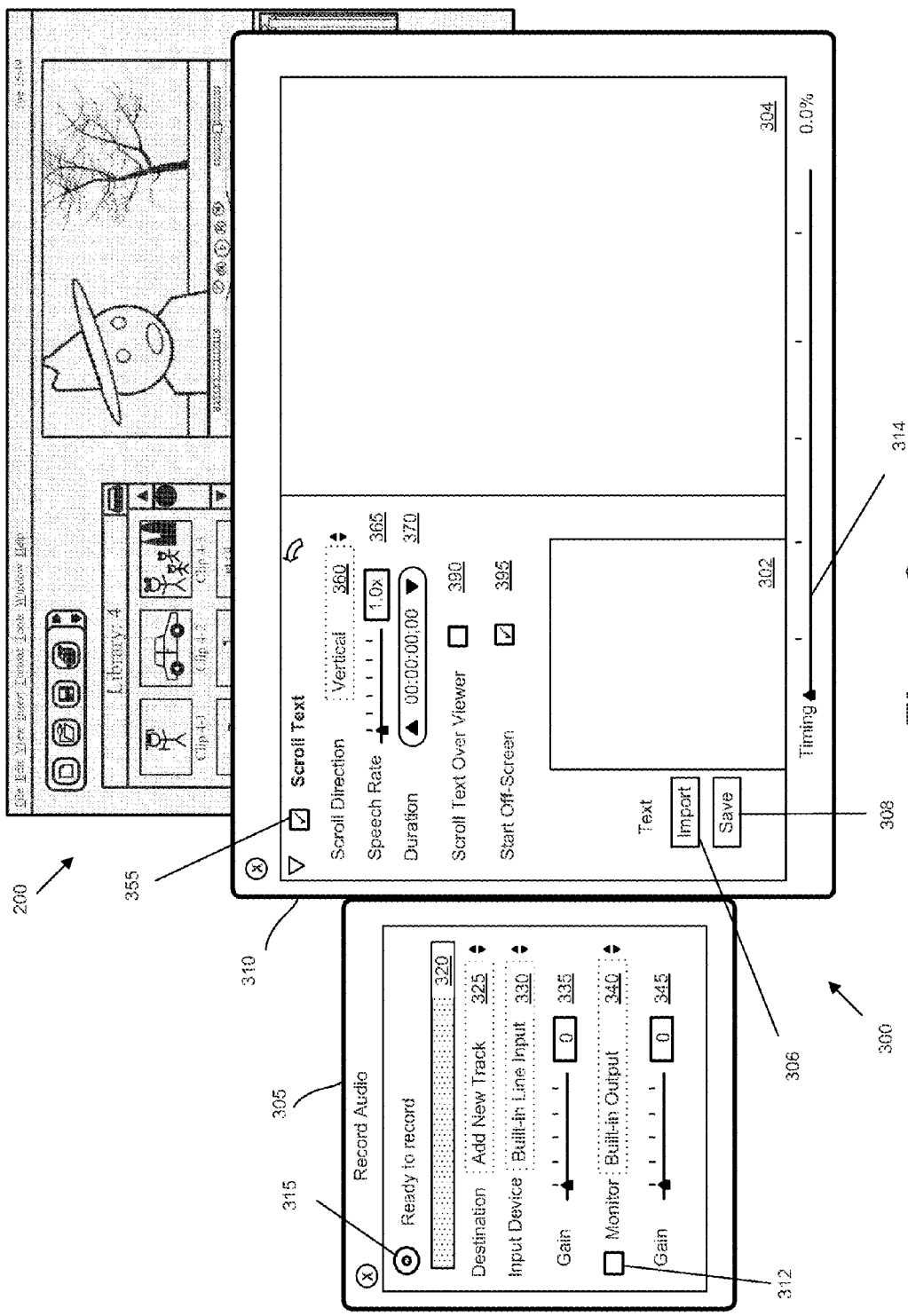
FIG. 3 illustrates an example voice-over tool with an audio recording tool and a teleprompter.

FIG. 3 illustrates the GUI 200 of the media editing application after the user's selection of the voice-over tool menu item 235. Specifically, this figure shows a voice-over tool 300 that includes two display sections 305 and 310. The display section 305 is an audio recording tool that provides several controls for recording audio clips (e.g., voice-over clips). The display section 310 is a teleprompter tool that provides several controls for optionally using the media editing application as a teleprompter when recording the audio clips.

1. Audio Recording Tool

The audio recording tool provides several different user-interface controls to record audio clips with the media editing application. As shown in FIG. 3, the audio recording tool 305 includes a destination selector 325, an input selector 330, an input gain level control 335, an output selector 340, an output gain level control 345, a record button 315, and an audio meter 320.

The destination selector 325 allows a user to specify a destination track in the composite display area 210 for an audio clip that is recorded with the media editing application. Specifically, the destination track is an output track where a representation of the audio clip is to be displayed when the audio clip is recorded. The user can select an existing track that includes a clip representation. The user can also select the audio clip to be represented in a new track, as illustrated in FIG. 3.

The input selector 330 is used to select an input device to record an audio clip. The user can use this control to select which input device to use to record the audio clip. In the example illustrated in FIG. 3, the selected input device is a built-in line input (e.g., built-in microphone).

The input gain level controller 335 is associated with the input selector 330. Specifically, the input gain level controller 335 controls the input recording volume of an input device (e.g., the selected or default input device). As shown in FIG. 3, the input gain level controller 335 includes a slider and a text field. However, other types of controls (e.g., dial knob, buttons, etc.), key strokes, and/or hotkeys may be provided to control the input gain level. The input gain level may be modified by adjusting the slider. A representation of the input gain level (e.g., in decibels) is displayed in the text field. In some embodiments, the text field is an input field that receives a parameter for adjusting the input gain level. The adjustment of the input gain level through the text field may in turn cause the slider to be adjusted.

The output selector 340 allows a user to specify an output device for audio during the recording session. In some embodiments, the output device plays the voice-over audio that is being recorded. Some embodiments output audio from a different track (e.g., a music track) which will be combined with the voice-over audio in the composite presentation. This allows a narrator to listen to the preview (e.g., through a headphone) while recording his or her voice using the media editing application. The output device may also provide sound cues (e.g., beeping sounds at the start point and the end point) to assist the narrator in recording the voice-over clip. The selected output device may be a built-in output (e.g., built-in speakers), headphones, etc. As shown in FIG. 3, the audio recording tool 305 provides a selectable option 312 for selecting a monitor as the output device.

The output gain level controller 345 is associated with the output selector 340. Specifically, the output gain level controller 345 controls the output recording volume of an output device (e.g., the selected or default output device). As shown in FIG. 3, the output gain level controller includes a slider and a text field that operate similarly to the input gain level controller 335.

The record button 315 is used to start the recording of an audio clip. When the teleprompter tool 310 is used in conjunction with the audio recording tool 305, a selection of the record button 315 also causes input text to be presented as output text in an output display area. In some embodiments, an initial selection of the record button 315 (e.g., through a cursor click operation, a touch operation) starts the recording session and a subsequent selection of this button stops or pauses the recording session. However, one or more other user interface controls, keystrokes, and hotkeys may be provided to start, stop, and pause the recording session. In some embodiments, the recording session automatically stops when an end point of a specified duration for a voice-over clip is reached.

The audio meter 320 displays the input audio level coming in through the selected input device or default input device. Specifically, the audio meter 320 provides the user with a visual indication of the input gain level. In some embodiments, a fluctuating bar may be displayed to indicate changes in the input gain level. Alternatively or conjunctively, the audio meter 320 may display different colors and/or patterns to provide the visual indication of the input gain level.

2. Teleprompter Tool

The teleprompter tool 310 controls the teleprompter feature of the media editing application. In some embodiments, the teleprompter tool 310 is an optional component of the voice-over tool 300 that appears when a user selects a selectable option (e.g., in the audio recording tool 305). As shown in FIG. 3, the teleprompter tool 310 includes a text area 302, an import control 306, an output display selector 390, an output display area 304, a speech rate controller 365, a scroll direction selector 360, a start off screen option 395, a scroll text option 355, a save control 308, a duration control 370, and a timing controller 314.

The text area 302 is an area of the teleprompter tool 310 for receiving input text for an audio clip (e.g., voice-over clip). The text area 302 may receive text in a number of different ways. For instance, a user may type and/or copy and paste the input text directly into the text area 302. Alternatively or conjunctively, the user may import text contained in one or more files (e.g., text file, word document) into the text area 302.

To facilitate import operations, the media editing application may provide one or more user-selectable controls. The import control 306 is one example of such control. As shown in FIG. 3, the import button 306 is displayed adjacent to the text area 302. A user of the media editing application can select the import control 306 to identify one or more files that contains text (e.g., voice-over script). In some embodiments, to allow the user to easily identify a file, a user's selection of an import tool (e.g., the import control 306) causes a file browser to be displayed. When a particular file is identified, some embodiments extract text contained in the particular file and populate the text area 302 with the extracted text. Different embodiments provide different controls to import text into the text area 302. For instance, a menu bar or a toolbar of the media editing application may include one or more selectable items for importing text.

The output display selector 390 allows a user to choose a display area that functions as a teleprompter during an audio recording session. In the example illustrated in FIG. 3, the output display area 304 within the teleprompter tool 310 or a viewer (i.e., a preview display area) can be selected to display output text. However, the media editing application might provide other display areas for displaying the output text. Several different example output display areas are described in detail in Section III below.

The speech rate controller 365 determines the rate at which output text is presented in an output display area (e.g., the output display area 304) for a narrator to read. By setting the rate anywhere between low and high, a user can customize the speech rate to match the timing of another clip (e.g., video clip, audio clip) in a composite presentation. In some embodiments, the output text is scrolled in the output display area based on the speech rate. For instance, when the speech rate is adjusted from a lower setting to a higher setting, the output text is scrolled at a faster speed in the output display area. Conversely, when the speech rate is adjusted from a higher setting to a lower setting, the output text is scrolled at a slower speed.

In the example illustrated in FIG. 3, the speech rate controller 365 includes a slider and a text field. However, other types controls (e.g., dial knob, buttons, etc.), key strokes, and/or hotkeys may be provided to control the speech rate setting. The speech rate setting may be modified by adjusting the slider. A representation of the speech rate setting is displayed in the text field. As shown in FIG. 3, the speech rate is displayed as a multiplier which indicates that the rate 1.0×. Alternatively, or conjunctively, in some embodiments, the speech rate is defined by counting the number of words in the input text over a set duration. For instance, the text field of the speech rate controller 365 may display that the current speech rate is x number of words per second or minute. In some embodiments, the text field is an input field that receives a parameter from a user for adjusting the speech rate. The adjustment of the speech rate with the text field may in turn cause the slider to be adjusted.

The scroll direction selector 360 controls the direction at which output text scrolls in an output display area such as the output display area 304. In some embodiments, the user can select a vertical option to have the text scroll vertically in the output display area. Optionally, a horizontal option may be selected to scroll the text horizontally.

The start off screen option 395 determines whether the output text starts off screen in an output display area when recording the recording begins. For instance, the output display area 304 may not initially display any scripted words when the start off screen option 395 and the record button 315 are both activated. However, as time elapses, the output text may gradually scroll and fill up the output display area 304. Similarly, when a user deactivates the start off screen option 395 and selects the record button 315, the recording session may begin with at least a portion of the output text already displayed in the output display area 304. Several more examples of starting off screen and starting on screen will be described in detail by reference to FIGS. 13 and 14 below.

The scroll text option 355 determines whether the scrolling effect is enabled or disabled. As shown FIG. 3, the scroll text option is a selectable option (e.g., check box) that indicates whether the scrolling effect is enabled or disabled. In some embodiments, when the scroll text option is disabled, an output display area displays the entire input text. Alternatively, the output display area may sequentially display different sections of the input text as time elapses. For instance, the output display area may display one portion of a script and another portion based on the time duration estimated or specified for the input script.

In some embodiments, when the scroll text option 355 is disabled, the media editing application may sequentially highlight one or more words, or different sections of the input text for a narrator to read in an output display area. For instance, instead of scrolling the text, the output display area 304 may highlight one or more words of an output text in the output display area 304 based on the set time duration for the input text and the speech rate.

The save control 308 allows a user to save input text in the text area 302. The input text may be saved to file (e.g., text file). In some embodiments, the input text is saved for transcription purpose or subtitle use. For instance, the input text may be saved to a composite presentation project. Also, the input text may be added as a text representation on a track of the composite display area 210. For instance, when the save control 308 is selected, a text representation may be automatically displayed along the timeline with other clip representations. This allows a subtitle for a voice-over to be easily incorporated as the text representation can be composited over a video clip representation. Different embodiments provide different controls to save input text. For instance, a menu bar or a toolbar of the media editing application may include one or more selectable items for saving the input text.

The duration control 370 allows a user to manually specify a duration for a voice-over clip. This allows the user to match the timing of the voice-over clip with another clip in a composite presentation prior to recording the voice-over clip. For instance, when only a particular time duration (e.g., 10 seconds) is available for a voice-over clip, the user can use this control to granularly adjust the voice-over clip's duration to match the particular time duration.

In the example illustrated in FIG. 3, the duration control 370 includes a text field for receiving a time duration. Instead of the text field, or in conjunction with it, the media editing application might provide other types of controls.

One example of such control is the timing controller 314. Similar to the duration control 370, the timing controller 314 controls the duration of a voice-over clip. However, instead of a text field, the timing controller includes an adjustable slider for adjusting the duration. Also, the timing controller 314 indicates the duration of voice-over clip by displaying a percentage rather than displaying the actual time duration. In some embodiments, the percentage represents the duration of a voice-over clip with respect to the duration of an entire composite presentation. For instance, the percentage may indicate that the duration of a voice-over clip is a particular percentage (e.g., 15%) of the entire duration of the composite presentation.

In some embodiments, the duration for a voice clip is associated with a speech rate setting that defines the presentation of input text in an output display area. In some such embodiments, an adjustment of the duration (e.g., using the duration control 370) causes the speech rate controller 365 to be automatically adjusted. Several examples of automatically adjusting the speech rate for a voice-over clip are described in detail by reference to FIGS. 6-8 below.

III. Timing Operations

The previous section described an example media editing application that implements the teleprompter tool in some embodiments. The following section describes using such teleprompter tool to perform timing operations prior to recording a voice-over clip. Specifically, in several of these examples, the teleprompter tool is used to match a timing of the voice-over clip with another clip in a composite presentation.

A. Inputting Voice-Over Text

Figure 4:
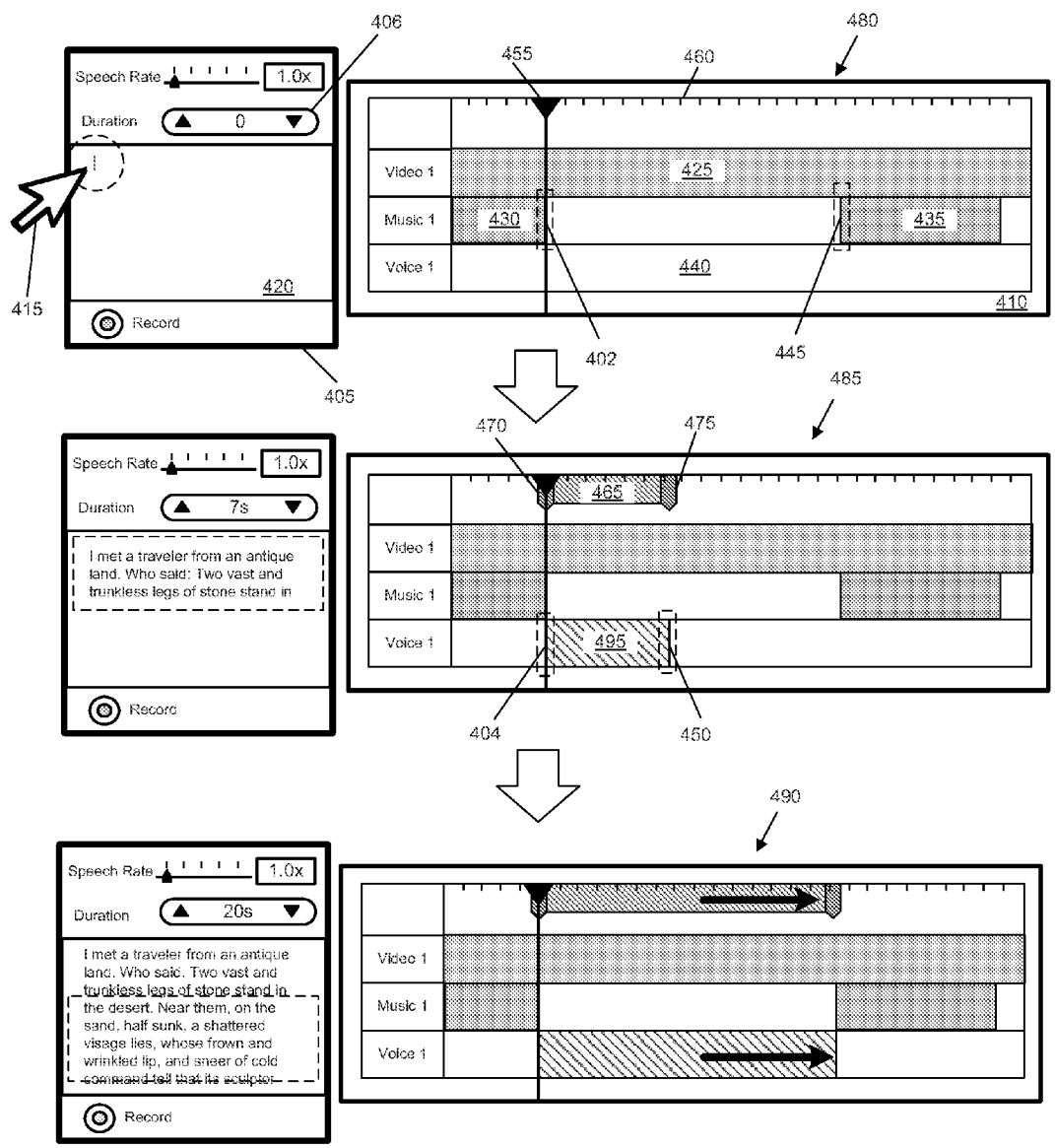
FIG. 4 illustrates inputting text in a text area of a teleprompter tool.

FIG. 4 illustrates inputting text into a text area 420 of a teleprompter tool 405. Specifically, this figure illustrates matching the timing of a voice-over clip with another clip in a composite presentation using several visual indications that are displayed when a user inputs text into the text area 420. Three operational stages 480-490 of the teleprompter tool 405 and the composite display area 410 are shown in FIG. 4. The teleprompter tool 405 and the composite display area 410 are similar to those described above by reference to FIGS. 1 and 3.

The first stage 480 shows the teleprompter tool 405 and the composite display area 410 prior to inputting text into the text area 420. As shown, the composite display area 410 displays a video clip representation 425 on a first track, and two music clip representation 430 and 435 on a second track. Each representation is defined by an in point (i.e., starting point) and an out point (i.e., ending point), and each of the in and out points corresponds to a particular time along a timeline 460. The user might have added these clips to the composite representation in a current editing session or by opening a composite project (alternatively referred to as a "project") that was defined in a previous editing session. The composite display area 410 also includes a track 440 that is empty for displaying a representation of a voice-over clip to be recorded.

In the first stage 480, to input text, the user has selected the text area 420 with a cursor 415. The duration control 406 indicates that the duration of the voice-over clip is 0 second. Also, the user has specified a starting point for a voice-over clip by using a playhead 455. Specifically, to specify the starting point, the user has moved the playhead 455 (e.g., through a cursor click and drag operation) along the timeline 460 to its current position. As shown, the starting point matches an out point 402 of the music clip representation 430. Different embodiments allow a user to specify a starting point differently. For instance, in some embodiments, the user can specify the starting point by marking an in point along the timeline 460.

The second stage 485 shows the teleprompter tool 405 and the composite display area 410 after the user inputs text into the text area 420. When the text area 420 receives text, some embodiments determine an estimated time that it would take for a narrator to read the input text in the text area 420. In some embodiments, the estimation is based on a time that an average speaker takes to read aloud a given number of words (e.g., one or more words) multiplied by the number words in the text area 420.

In some embodiments, the estimated duration is calculated to provide real-time timing references for a voice-over clip. This is illustrated in the second stage 485 as the text input causes the composite display area 410 to display a voice-over clip indication 465 and a voice-over clip representation 495. Also, the input causes the estimated duration to be displayed in an area of the duration control 406. Specifically, the duration control 406 indicates that the estimated duration for reading the text in the text area 420 is 7 seconds.

As shown in the second stage 485, the voice-over clip indication 465 is displayed on the timeline 460 of the composite display area 410. The voice-over clip indication 465 includes an in point marker 470 and an out point marker 475. The in point marker 470 is positioned along the timeline 460 at the location corresponding to the position of the playhead 455 that represents the user specified starting point of the voice-over clip. The out point marker 475 is a predicted out point for the voice-over clip. Based the input text, the out point marker 475 is positioned along the timeline 460 at a location corresponding to a time when the voice-over clip is predicted to end. The distance between the in point marker 470 and the out point marker 475 corresponds to the time estimated for reading the input text in the text area 420. In the example illustrated in FIG. 4, a horizontal bar extends across the distance between the two markers 470 and 475 to allow a user to visualize the timing of the voice-over clip along with one or more other clips in the composite presentation.

In the second stage 485, the text input also causes the track 440 to be populated with the voice-over clip representation 495. The voice-over clip representation 495 spans across the timeline 460 along the track 440 starting from an in point 404 ending at an out point 450. The positions of the in and out points 404 and 450 of the voice clip representation correspond to the positions of the in and out point markers of the voice-over clip indication 465. Similar to the voice-over clip indication 465, the voice-over clip representation 495 provides a visual timing reference for the voice-over clip. Here, the voice-over clip representation 495 is a representation of the voice-over clip prior to the clip being recorded. As will be described in detail below by reference to FIG. 11, some embodiments display a different voice-over clip representation or modify the appearance of the voice-over clip representation 495 when the voice clip is actually recorded.

As shown in the second stage 485, with the initial input text, the voice-over clip indication 465 and the voice-over clip representation 495 expand partially across the composite display area 410 along the timeline 460. However, there is a timing gap between the out point marker 475 of the voice-over clip indication 465 and an in point 445 of the music clip representation 435. Correspondingly, a timing gap exists between the out point 450 of the voice-over clip representation 495 and the in point 445 of the music clip representation 435.

The third stage 490 shows matching the timing of the voice-over clip with the music clip by inputting additional text into the text area 420. The additional text input causes the estimated duration of the voice-over clip to be recalculated. This is reflected in the duration control 406 that indicates that the new estimated duration is 20 seconds instead of 7 seconds. Also, the out point marker 475 of the voice-over clip indication 465 moves away from the in point marker 470 to reflect the new estimated duration. Similarly, the out point 450 of the voice-over clip representation 495 moves away from the representation's in point 404. In the example illustrated in the third stage 490, to match the timing of the voice-over clip with the music clip, the user inputs just enough text to align the out point marker 475 and the out point 450 with the in point 445 of the music clip representation 435.

In the example described above, several different visual feedbacks are displayed in the composite display area 410 for the estimated duration. However, in some embodiments, the media editing application may display only the voice-over clip indication 465, a set of markers (e.g., markers 470 and 475), or the voice-over clip representation 495. Alternatively or conjunctively, other such visual feedbacks for the estimated duration may be provided. For instance, a numeric representation of the estimated duration may be displayed in the composite display area 410 or elsewhere. Also, one or more keyframe representations may be displayed in a keyframe display section to provide a timing reference for the voice-over clip.

In the example described above, the duration for the voice-over clip is automatically calculated based on input text. Alternatively, or conjunctively, some embodiments allow the duration to be set manually. In some such embodiments, when a user enters text into the text area 420, the media editing application might count the number of words in the text area and calculates a speech rate for the number of words based on the set duration. The media editing application may then indicate to the user that the speech rate is a particular number of words per minute or second.

B. Speech Rate Controller Adjustment

Figure 5:
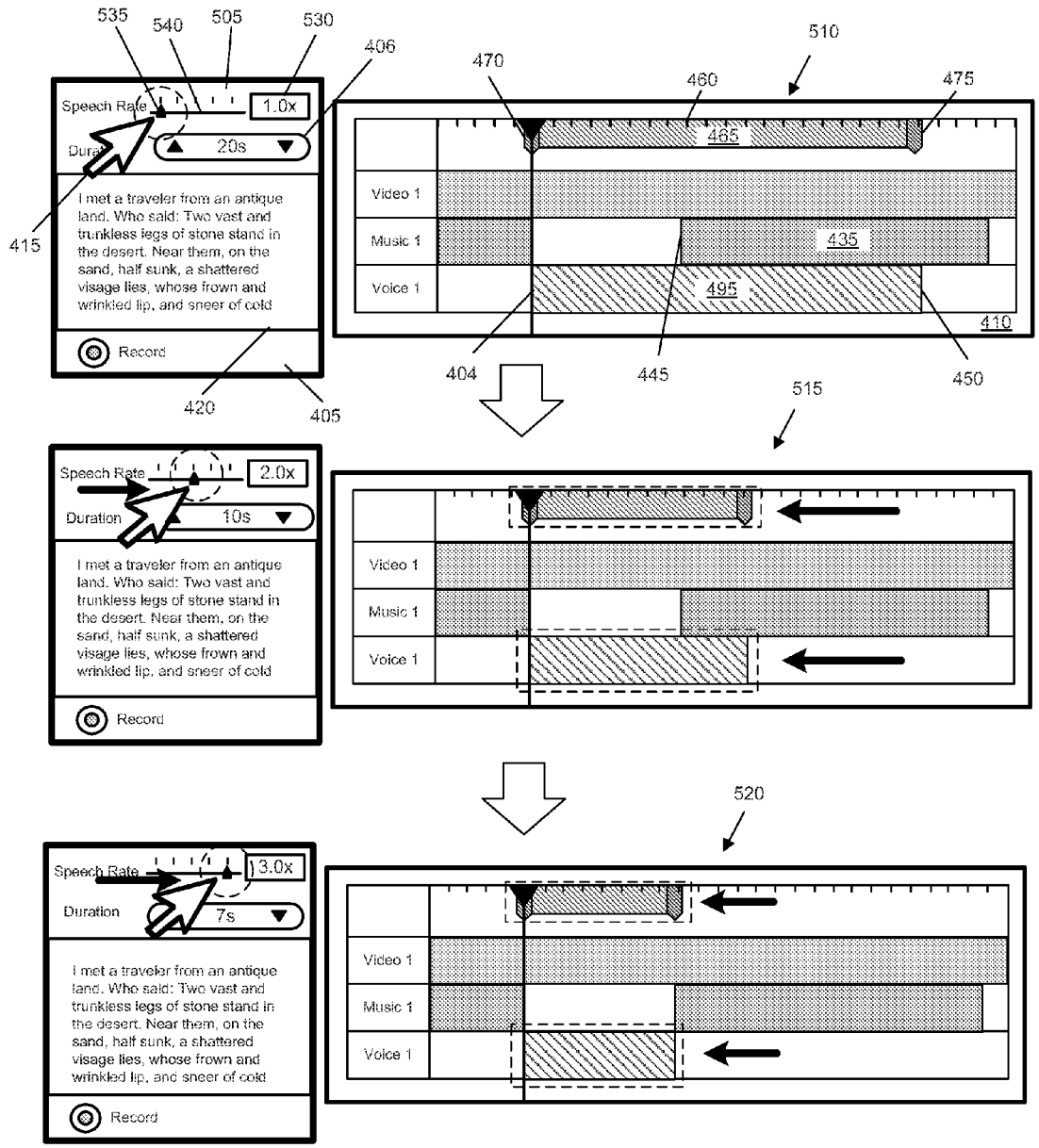
FIG. 5 illustrates an example of using a speech rate controller to adjust the speech rate setting.

FIG. 5 illustrates an example of using a speech rate controller 505 to adjust the speech rate setting. Specifically, this figure illustrates how the speech rate controller 505 can be used to match the timing of a voice-over clip with another audio clip in a composite presentation. Three operational stages 510-520 of the teleprompter tool 405 and the composite display area 410 are illustrated in FIG. 5. The teleprompter tool 405 and the composite display area 410 are the same as the one illustrated in FIG. 4.

The first stage 510 shows the teleprompter tool 405 and the composite display area 410 prior to the adjustment of the speech rate using the speech rate controller 505. As shown in FIG. 4, the speech rate controller 505 includes a slider with a knob 535 that moves along a slider bar 540. The speech rate controller also includes a text field 530 that displays a representation of the speech rate setting. In some embodiments, the text field 530 is an input area that receives a parameter for adjusting the speech rate setting. The adjustment of the speech rate setting with the text field 530 may in turn cause the knob 535 to be moved along the slider bar 540 to a position that corresponds to the adjusted speech rate setting.

As shown in the first stage 510, the text area 420 includes input text. To provide timing references, an estimated duration for the input text is represented in the composite display area 410 by the voice-over clip indication 465 and the voice-over clip representation 495. The duration control 406 also indicates the estimated duration to be 20 seconds.

In the first stage 510, the voice-over clip indication 465 and the voice-over clip representation 495 expand partially across the composite display area 410 along the timeline 460. However, the timing of the voice-over clip overlaps the timing of a music clip in the composite presentation. Specifically, the out point marker 475 of the voice-over clip indication 465 and the corresponding out point 450 of the voice-over clip representation 495 moves past the in point 445 of the music clip representation 435.

The second stage 515 shows the adjustment of the speech rate controller 505. Specifically, the knob 535 is moved along the slider bar 540 from a first position to a second position through the cursor 415. The second position represents a speech rate setting that is higher than the one represented by the first position. This is shown by the text field 530 which indicates that the speech rate setting has been adjusted from the "1.033" rate to a "2.033" rate.

To account for a change in the speech rate, some embodiments recalculate the estimated duration calculated for a voice clip. In some embodiments, the estimated duration is multiplied by a value associated with a speech rate setting in order to derive a new estimate. For instance, when the speech rate setting changes from a normal speed to a double speed, the estimated duration might be multiplied by ½ to account for the change. Conversely, when the speech rate setting changes from the normal speed to half speed, the estimated duration might be multiplied by 2.

By associating the speech rate setting with the estimated duration, some embodiments allow timing operations to be performed with the speech rate controller 505. As mentioned above, the distance between the in point marker 470 and the out point marker 475 of the voice-over clip indication 465 corresponds to the estimated duration for recording input text in the text area 420. In the second stage 520, the adjustment of the speech rate controller 505 to a higher speech rate causes the estimated duration to be recomputed. As the higher speech rate setting reduces the estimated duration, the out point marker 475 of the voice indications moves along the timeline 460 towards the in point marker 470. Similarly, the out point 450 of the voice-over clip representation 495 moves towards the representation's in point 404. The duration control 406 also indicates that the estimated duration is recomputed to be 10 seconds instead of 20 seconds.

The third stage 520 shows matching the timing of the voice-over clip with the music clip by adjusting the speech rate controller 505. Specifically, the user adjusts the knob 535 of the slider 505 until the out point marker 475 of the voice-over clip indication 465 and the corresponding out point 450 of the voice-over clip representation 495 are aligned with the in point 445 of the music clip representation 435.

C. Marker Adjustment

1. Out Point Marker Adjustment

Figure 6:
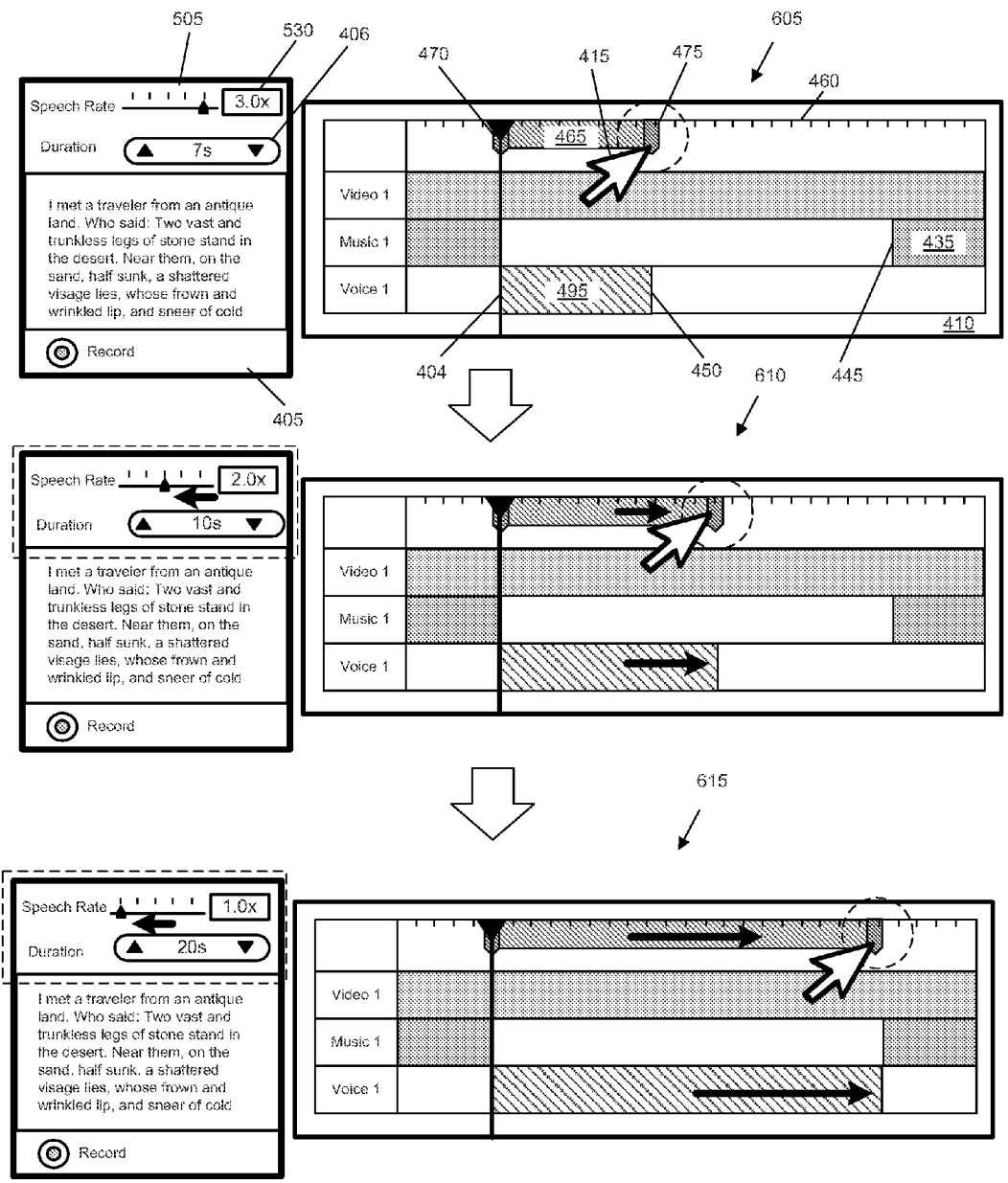
FIG. 6 illustrates matching the timing of a voice-over clip with another audio clip by moving an out point marker of a voice-over clip indication.

FIG. 6 illustrates matching the timing of a voice-over clip with another audio clip by moving the out point marker 475 of the voice-over clip indication 465. Three operational stages 605-615 of the teleprompter tool 405 and the composite display area 410 are shown in FIG. 6. The teleprompter tool 405 and the composite display area 410 are the same as the one illustrated in FIGS. 4 and 5.

The first stage 605 shows the teleprompter tool 405 and the composite display area 410 prior to the movement of the out point marker 475. As shown, the text area 420 includes input text. The speech rate is set at a "3.0×" rate as indicated by the text field 530 of the speech rate controller 505. To provide timing references, an estimated duration for the input text is represented in the composite display area 410 by the voice-over clip indication 465 and the voice-over clip representation 495. The duration control 406 also indicates the estimated duration is 7 seconds. The cursor 415 is placed over the out point marker 475 to change the estimated duration.

As shown in the first stage 605, the voice-over clip indication 465 and the voice-over clip representation 495 expand partially across the composite display area 410 along the timeline 460. However, a timing gap exists between the out point marker 475 of the voice-over clip indication 465 and an in point 445 of the music clip representation 435. Similarly, a timing gap exists between the out point 450 of the voice-over clip representation 495 and the in point 445 of the music clip representation 435.

The second stage 610 shows a manual adjustment of the estimated duration by moving the out point marker 475 along the timeline 460. Specifically, to adjust the voice-over clip's estimated duration, the out point marker 475 is moved away from the in point marker 470. The distance between the in point marker 470 and the out point marker 475 corresponds to a manually set duration for the voice-over clip. The movement of the out point marker 475 causes the out point 450 of the voice-over clip representation 495 to be moved away from the representation's in point 404. The duration control 406 is also automatically adjusted based on the movement of the marker. Specifically, in this second stage 610, the duration control 406 indicates that the manually set duration is 10 seconds instead of the estimated duration of 7 seconds.

In the second stage 610, although the duration of the voice-over clip has increased, the amount of text inputted in the text area of the teleprompter tool has not changed. To account for this discrepancy, some embodiments automatically modify the speech rate. For instance, when a duration of a voice clip decreases, the speech rate may automatically increase as less time is available for a narrator to read the output text. Conversely, when a duration of a voice clip increases, the speech rate may automatically decrease as more time is available to read the output text. This is illustrated in the second stage 610 as the increase in the duration causes the speech rate setting to decrease from "3.0×" to "2.0×".

The third stage 615 shows an example of matching the timing of the voice-over clip with the music clip by selecting and moving the out point marker 475. Specifically, the out point marker 475 is moved to a location along the timeline 460 that corresponds to the in point 445 of the music clip representation 435. The movement of the out point marker causes the out point 450 of the voice-over clip representation 495 to be moved to the location on the timeline 460 that corresponds to the in point 445 of the music clip representation 435. Also, as the duration of the voice-over clip has increased, the speech rate setting decreases from "2.0×" to "1.0×".

2. In Point Marker Adjustment

Figure 7:
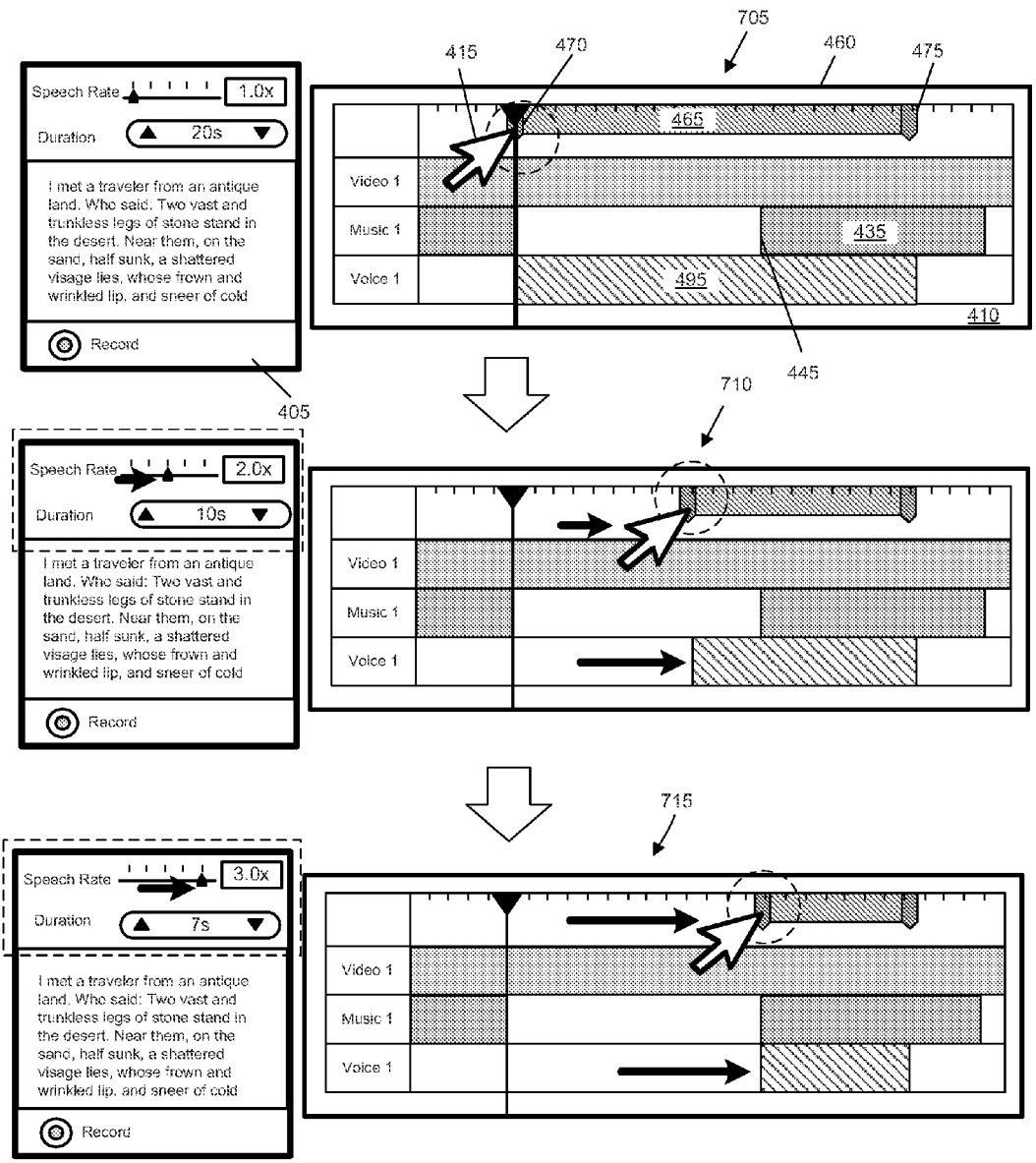
FIG. 7 illustrates adjusting the timing of a voice-over clip by selecting and moving the in point marker of a voice-over clip indication.

In the previous example, the out point marker 475 is moved to match the timing of the voice-over clip with the music clip. FIG. 7 illustrates adjusting the timing of the voice-over clip by selecting and moving the in point marker 470 of the voice-over clip indication 465. Three operational stages 705-715 of the teleprompter tool 405 and the composite display area 410 are shown in FIG. 7. These operational stages 705-715 are similar to the example described above in FIG. 6. Specifically, in the first stage 705, the cursor 415 is placed over the in point marker 470 to change the estimated duration for the voice-over clip. The second stage 710 shows manually decreasing the duration of the voice-over clip by moving the in point marker 470 towards the out point marker 475. The change in the duration causes the speech rate to automatically increase. Lastly, the third stage 715 shows that the timing of the voice-over clip is matched with the music clip by aligning the in point marker 470 with the in point 445 of the music clip representation 435. In this situation, the voice-over will be played over both the music clip and video clip in the composite presentation.

D. Duration Control Adjustment

Figure 8:
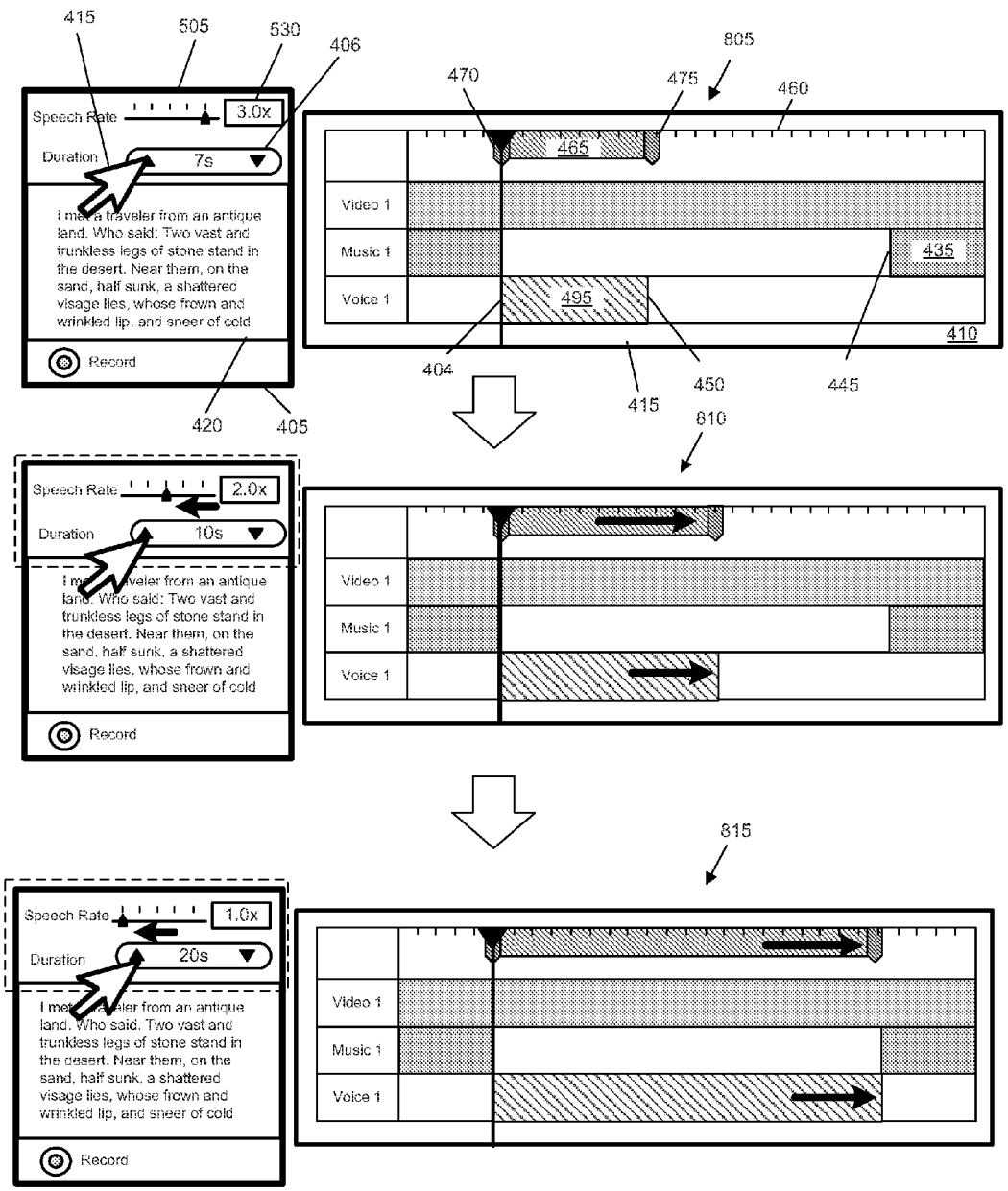
FIG. 8 illustrates matching the timing of a voice-over clip with another audio clip using a duration modifying control of the teleprompter tool.

FIG. 8 illustrates matching the timing of a voice-over clip with another audio clip using the duration control 406 of the teleprompter tool 405. Three operational stages 805-815 of the teleprompter tool 405 and the composite display area 410 are shown in FIG. 8. The teleprompter tool 405 and the composite display area 410 are the same as the one illustrated in FIGS. 4-7.

The first stage 805 shows the teleprompter tool 405 and the composite display area 410 prior to adjusting the estimated duration. As shown, the text area 420 includes input text. The speech rate is set at a "3.0×" rate as indicated by the text field 530 of the speech rate controller 505. To provide timing references, the estimated duration for the input text is represented in the composite display area 410 by the voice-over clip indication 465 and the voice-over clip representation 495. The duration control 406 also indicates the estimated duration to be 7 seconds. The cursor 415 is placed over the duration control 406 to manually adjust the estimated duration.

As shown in the first stage 805, the voice-over clip indication 465 and the voice-over clip representation 495 expand partially across the composite display area 410 along the timeline 460. However, a timing gap exists between the out point marker 475 of the voice-over clip indication 465 and an in point 445 of the music clip representation 435. Correspondingly, a timing gap exists between the out point 450 of the voice-over clip representation 495 and the in point 445 of the music clip representation 435.

The second stage 810 shows a manual adjustment of the estimated duration by inputting a time duration using the duration control 406. Specifically, to adjust the voice-over clip's estimated duration, the user inputs a new duration of 10 seconds (e.g., by inputting a parameter value into a text field 530, selecting a user interface item for increasing the duration on the duration control). The change in the duration causes the voice-over clip indication 465 and the voice-over clip representation 495 to expand along the timeline 460 of the composite display area 410. Similar to the example described above in FIG. 6, the change in the estimated duration causes the speech rate to be automatically adjusted.

The third stage 815 shows an example of matching the timing of the voice-over clip with the music clip using the duration control 406. Specifically, in this example, the user matches the timing by specifying a particular duration that matches the in point 445 of the music clip representation 435. Also, as the duration of the voice-over clip has increased, the speech rate setting decreases from "2.0×" to "1.0×".

E. Voice-Over Clip Representation Adjustment

FIG. 7 and FIG. 8 illustrated the use of the in and out point markers of a voice-over clip indication to modify the duration of a voice-over clip prior to recording the voice-over audio. Similarly, when a voice-over clip representation is displayed in the track of the composite display area, some embodiments allow a user to use the in and out points of the clip representation as selectable items to modify the clip. For instance, as described below, in some embodiments, the user can (1) modify the duration of the clip with the out point 450 and (2) reposition the clip along the timeline (without modifying the duration) with the in point 404.

1. Duration Adjustment by Moving Out Point

Figure 9:
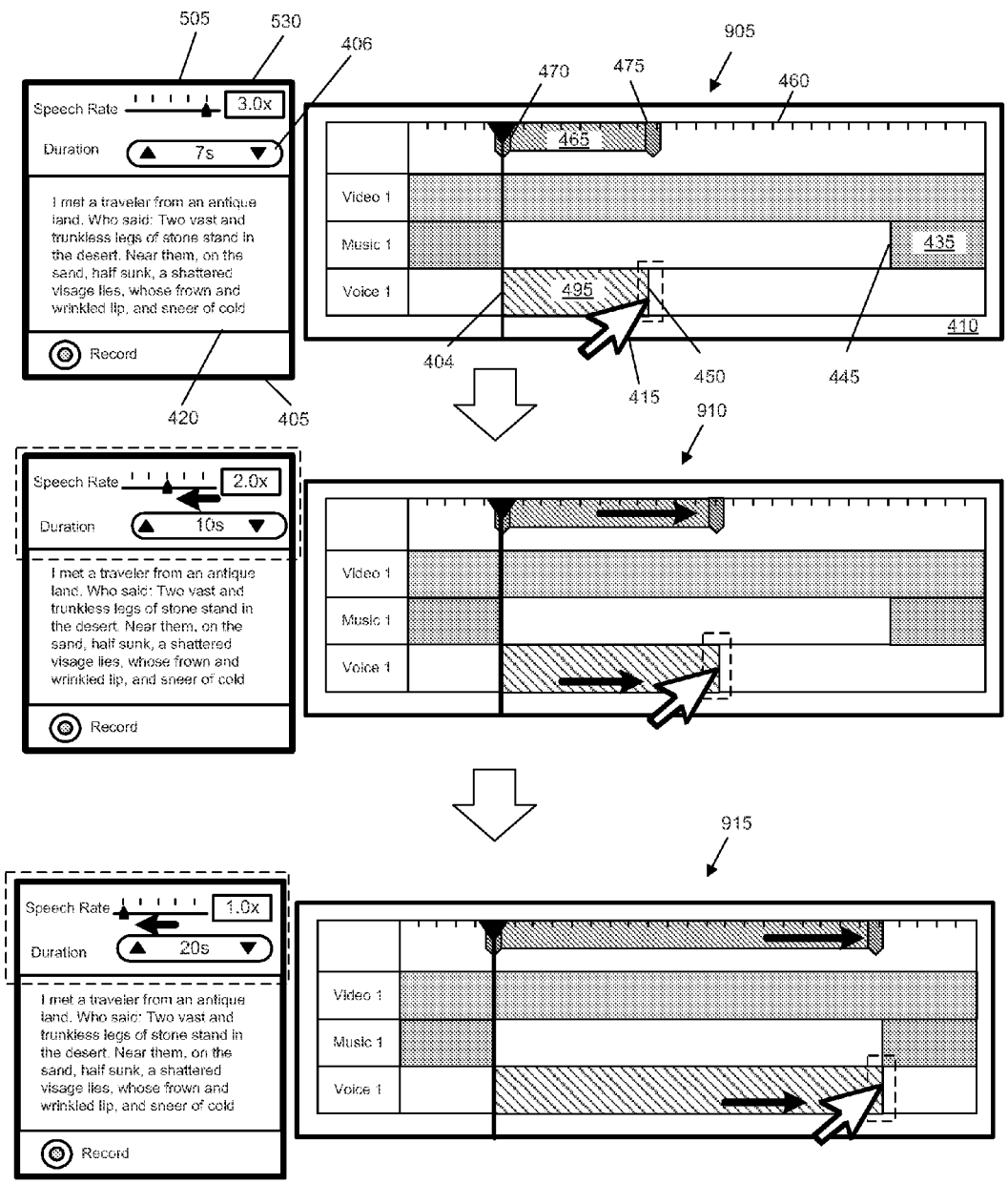
FIG. 9 illustrates matching the timing of a voice-over clip with another audio clip by moving an out point of a voice-over clip representation.

In the previous example, the duration of a voice-over clip is modified to perform a timing operation prior to recording the voice-over. FIG. 9 illustrates another example of performing a timing operation prior to recording the voice-over clip. Specifically, it illustrates matching the timing of a voice-over clip with another audio clip by moving the out point 450 of the voice-over clip representation 495. Three operational stages 905-915 of the teleprompter tool 405 and the composite display area 410 are shown in FIG. 9. The teleprompter tool 405 and the composite display area 410 are the same as the one illustrated in FIGS. 4-8.

The first stage 905 shows the teleprompter tool 405 and the composite display area 410 prior to the movement of the out point 450. As shown, the text area 420 includes input text. The speech rate setting is set at a "3.0×" rate as indicated by the text field 530 of the speech rate controller 505. To provide timing references, an estimated duration for the input text is represented in the composite display area 410 by the voice-over clip indication 465 and the voice-over clip representation 495. The duration control 406 indicates that the estimated duration is 7 seconds. The cursor 415 is placed over the out point 450 to change the estimated duration.

As shown in the first stage 905, the voice-over clip indication 465 and the voice-over clip representation 495 expand partially across the composite display area 410 along the timeline 460. However, a timing gap exists between the out point marker 475 of the voice-over clip indication 465 and an in point 445 of the music clip representation 435. Similarly, a timing gap exists between the out point 450 of the voice-over clip representation 495 and the in point 445 of the music clip representation 435.

The second stage 910 shows a manual adjustment of the estimated duration by moving the out point 450 along the timeline 460. Specifically, to increase the duration of voice-over clip, the out point 450 is moved away from the representation's in point 404. The movement of the out point 450 causes the out point marker 475 of the voice-over clip indication 495 to be moved away from the indication's in point marker 470. The distance between the in point 404 ant the out point 450 corresponds to a manually set duration for the voice-over clip.

In the second stage 910, although the duration of the voice-over clip has increased, the amount of text inputted in the text area of the teleprompter tool has not changed. To account for this discrepancy, some embodiments automatically modify the speech rate. For instance, when a duration of a voice clip decreases, the speech rate may automatically increases as less time is available for a narrator to read the output text. Conversely, when a duration of a voice clip increases, the speech rate may automatically decrease as more time is available to read the output text. This is illustrated in the second stage 910 as the increase in the duration causes the speech rate setting to decrease from "3.0×" to "2.0×". The duration control 406 is also automatically adjusted based on the movement of the out point. Specifically, in this second stage 610, the duration control 406 indicates that the manually set duration is 10 seconds.

The third stage 915 shows an example of matching the timing of the voice-over clip with the music clip by selecting and moving the out point 450. Specifically, in this example, the out point 450 is moved to a location on the timeline 460 that corresponds to the in point 445 of the music clip representation 435. However, the in point 404 remain at a same position as the duration of the voice-over clip has been increased. This new duration is represented in the composite display area 410 by the increased distance between the in and out points (404 and 450) of the voice-over clip representation 495 along the timeline 460. Correspondingly, the movement of the out point 450 causes the out point marker 475 of the voice-over clip indication 465 to be moved to a location on the timeline that corresponds to the in point 445 of the music clip representation 435. Also, in this example, as the duration of the voice-over clip has increased, the speech rate setting automatically decreases from "2.0×" to "1.0×".

In the example described above, the out point 450 of the voice-over clip representation 495 is moved to adjust the duration of the voice-over clip prior to its recording. In some embodiments, when the voice-over clip is recorded, a selection and movement of in point or out point of a voice-over clip representation (i.e., a clip representation representing a portion of a recorded audio file) causes the portion of the recorded audio file that is part of the composite presentation to be modified.

2. Position Adjustment by Moving in Point

Figure 10:
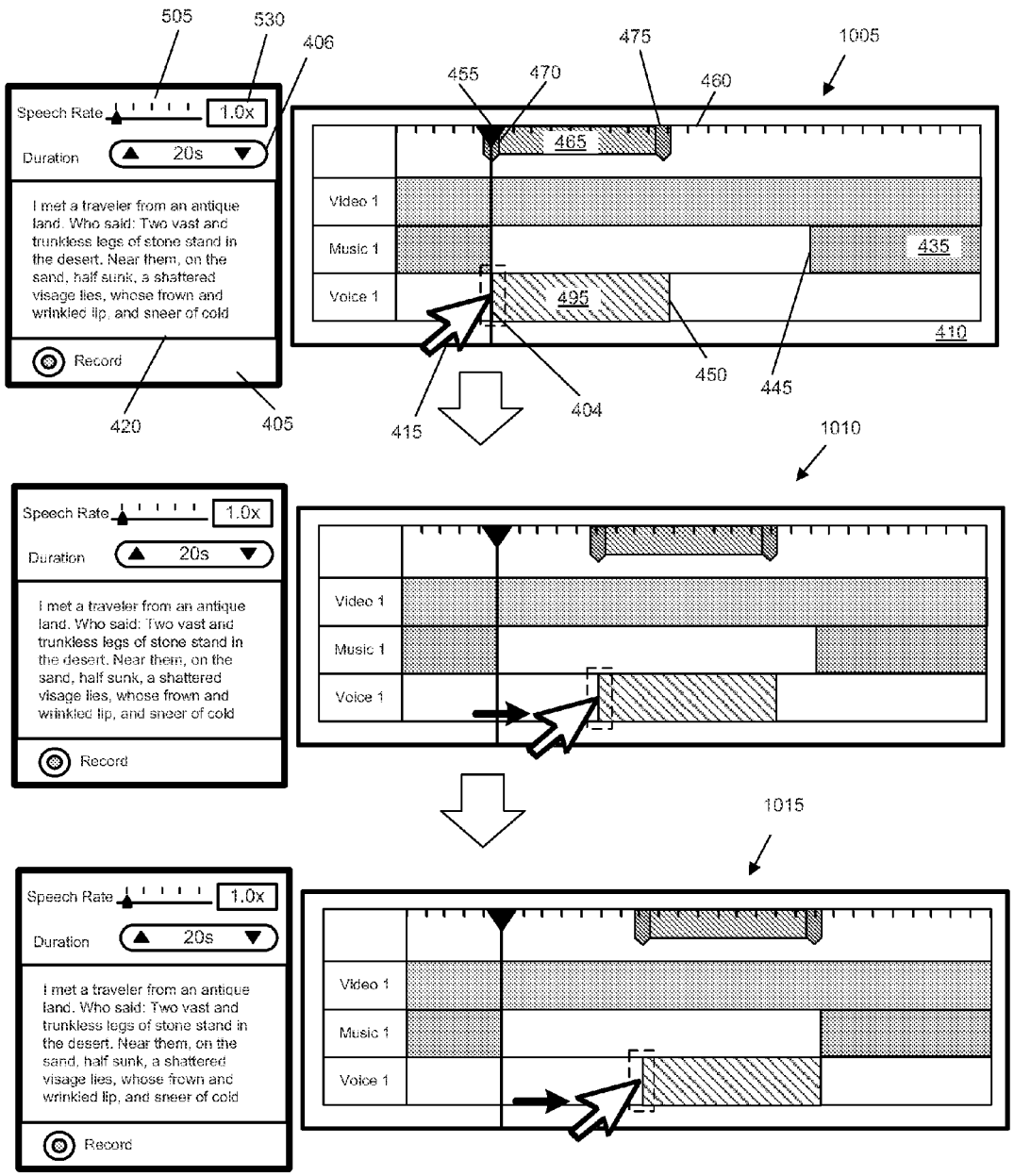
FIG. 10 illustrates matching the timing of a voice-over clip with another audio clip by moving the in point of a voice-over clip representation.

FIG. 10 illustrates matching the timing of a voice-over clip with another audio clip by moving the in point 404 of the voice-over clip representation 495. Three operational stages 1005-1015 of the teleprompter tool 405 and the composite display area 410 are shown in FIG. 10. The teleprompter tool 405 and the composite display area 410 are the same as the one illustrated in FIGS. 4-9.

The first stage 1005 shows the teleprompter tool 405 and the composite display area 410 prior to the movement of the in point 404. As shown, the text area 420 includes input text. The speech rate setting is set at a "1.0×" rate as indicated by the text field 530 of the speech rate controller 505. To provide timing references, an estimated duration for the input text is represented in the composite display area 410 by the voice-over clip indication 465 and the voice-over clip representation 495. The duration control 406 indicates that the estimated duration is 20 seconds. The cursor 415 is placed over the in point 404 of the voice-over clip representation 495 in order to relocate the starting point for the voice-over clip.

As shown in the first stage 1005, the voice-over clip indication 465 and the voice-over clip representation 495 expand partially across the composite display area 410 along the timeline 460. However, a timing gap exists between the out point marker 475 of the voice-over clip indication 465 and an in point 445 of the music clip representation 435. Similarly, a timing gap exists between the out point 450 of the voice-over clip representation 495 and the in point 445 of the music clip representation 435.

The second stage 1010 shows an adjustment of the position of the voice-over clip by moving the in point 404 along the timeline. Specifically, to reposition the voice-over clip representation 495, the in point 404 is moved horizontally towards the representation's out point 450. In this example, instead of contracting, the voice-over clip representation 495 is moved towards the position corresponding to the in point 445 of the music clip representation 435. The movement also causes the voice-over clip indication 465 to be moved in accord with the voice-over clip representation 495. As the duration of the voice-over clip has not changed, the duration control 406 indicates the duration to be the same as the first stage 1005. Also, the speech rate setting remains the same at "1.0×" rate.

The third stage 1015 shows an example of matching the timing of the voice-over clip with the music clip. Specifically, the in point 404 is moved such that the representation's out point 450 is at a location on the timeline 460 that corresponds to the in point 445 of the music clip representation 435. The movement also causes the out point marker 475 of the voice-over clip indication 465 to be aligned with the in point 445 of the music clip representation 435.

In the example described above, the in point 404 of the voice-over clip representation is used to reposition a voice-over clip in a composite presentation. Instead of the representation's in point, or in conjunction with it, some embodiments allow the voice-over clip to be repositioned with the representation's out point 450, the in point marker 470, and/or the out point marker 475. In some such embodiments, a movement of the in point 404 causes the duration of the voice-over clip to be modified while a movement of the in point marker 470 causes the voice-over clip to be repositioned. Alternatively, or conjunctively, the area between the in point marker 470 and the outpoint marker 475 of the voice-over clip indication 465, or the area between the in point 404 and out point 450 of the voice-over clip representation 495 may be selected to reposition the voice-over clip. Also, some embodiments allow the voice-over clip to be repositioned by selecting and moving the playhead 455 on the timeline 460.

To differentiate between moving a voice-over clip and changing the duration of the voice-over clip, some embodiments display one or more visual indications. For instance, the media editing application may change the color or pattern of the voice-over clip representation 495 or the voice-over clip indication 465, change the display of the cursor 415, highlight the in point or out point of the voice-over representation, etc. Some embodiments will move the entire clip along the timeline when a hotkey is selected, and move the in or out point when no hotkey is selected, or vice versa.

The examples illustrated in FIGS. 4-10 are described above to include certain features for performing timing operations prior to a recording phase. However, one of ordinary skill will realize that not all these features need to be used together. For instance, some embodiments might allow a set of markers to be selected and moved but might not allow a representation's in and out points to be moved. Similarly, some embodiments might allow input text to modify an estimated duration for a voice-over clip but might not allow a speech rate setting to affect the estimated duration.

In the examples described above, the speech rate setting is represented in the text field 530 as a particular multiplier. Instead of such particular multiplier, or in conjunction with it, in some embodiments, the speech rate is specified as a number of words a narrator has to read in a given instance of time. For instance, when a user enters text into the text area 420, the media editing application may indicate to the user that the speech rate is x number of words per a second or minute. To display such speech rate, the media editing application might count the number of words in the text area and calculate the speech rate based on the amount of time estimated or allocated for the voice-over clip.

Also, in the examples described above, a cursor (e.g., the cursor 415) is used to manipulate various user interface items in order to perform different timing operations. In some embodiments, these operations and functionalities are performed based on different commands that are received from users through different input devices (e.g., keyboard, track pad, touchpad, mouse, etc.). An example of such a device is a touch screen device. In some embodiments, with touch control, a user can directly manipulate various user interface items (e.g., the speech rate controller 505, voice-over clip indication 465, voice-over clip representation 495, etc.) by interacting with (e.g., by swiping, touching, etc.) these items on a touchscreen.

III. Recording Voice-Over Clip

A. Composite View

Figure 11:
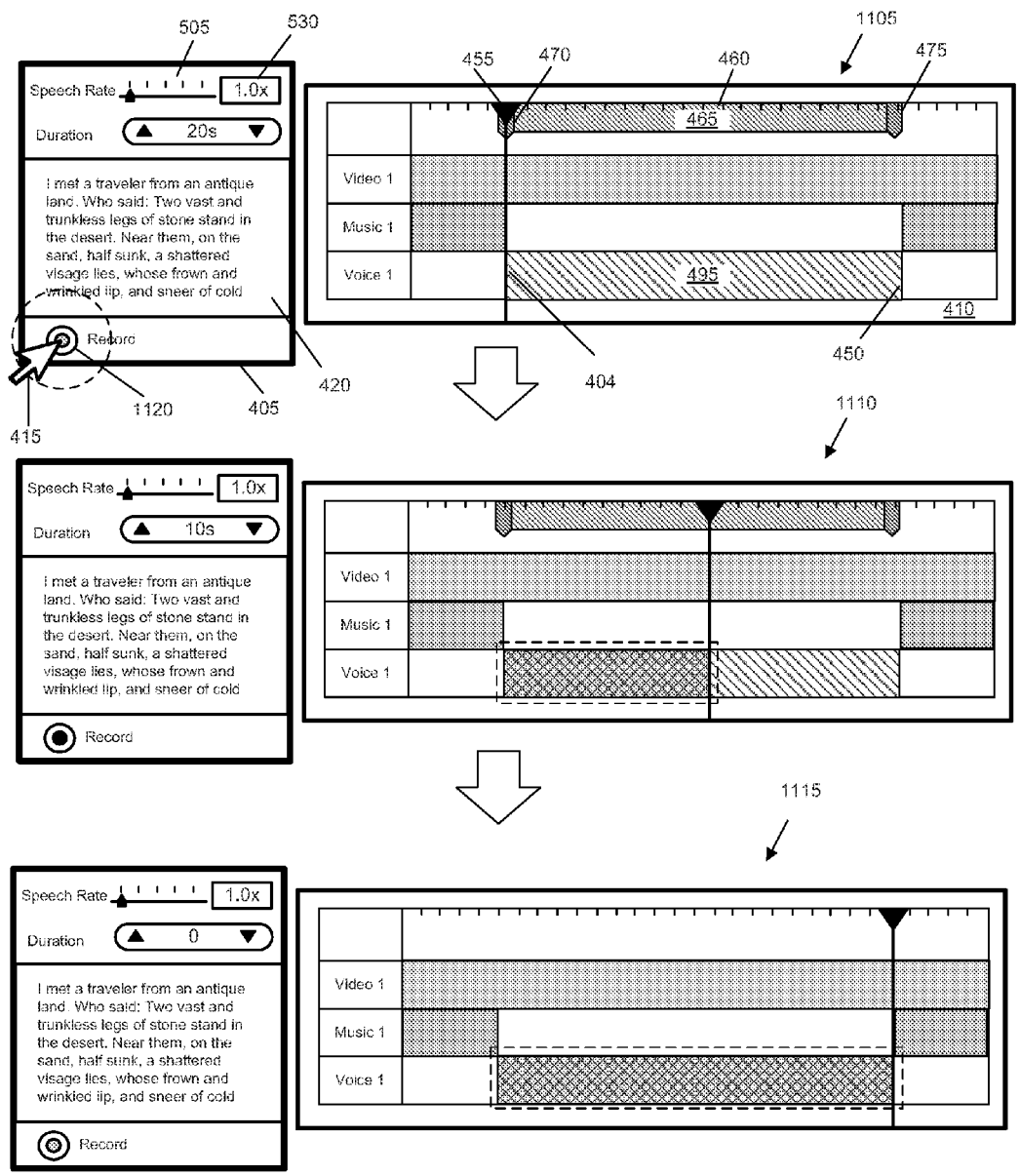
FIG. 11 illustrates an example a composite display area during a voice-over clip recording session.

FIG. 11 illustrates an example of the composite display area 410 during a voice-over clip recording session. Three operational stages 1105-1115 of the teleprompter tool 405 and the composite display area 410 are shown in FIG. 11. The teleprompter tool 405 and the composite display area 410 are the same as the one illustrated in FIGS. 4-10. For purposes of simplifying the description of this figure, only the teleprompter tool 405 and the composite display area 410 of the media editing application are shown. However, as will be described below, a display area of the media editing application might act as a teleprompter by scrolling text during the recording session.

The first stage 1105 shows the teleprompter tool 405 and the composite display area 410 prior to a user's selection of a record button 1120 in the voice-over tool 405. As shown, the text area 420 includes input text. The speech rate setting is set at a "1.0×" rate as indicated by the text field 530 of the speech rate controller 505. To provide timing references, an estimated duration for the input text is represented in the composite display area 410 by the voice-over clip indication 465 and the voice-over clip representation 495. The duration control 406 indicates that the estimated duration is 20 seconds.

As shown in the first stage 1105, the playhead 455 is located on the timeline 460 that corresponds to a starting point of the voice-over clip. The starting point is represented in the composite display area 410 by the in point marker 470 of the voice-over clip indication and the in point 404 of the voice-over clip representation 495. The cursor 415 is placed over the record button 1120 of the voice-over tool 405. However, the record button 1120 has not been activated to start the recording session.

The second stage 1110 shows the composite display area 410 and teleprompter tool 405 after the user selects the record button 1120 through the cursor 415. Specifically, this stage illustrates that the selection of the record button 1120 causes the playhead 455 to move along the timeline 460 in accord with the duration of the recording session. Also, as time elapses, the voice-over clip representation changes in appearance (e.g., gradually fills up) to indicate the portion of the voice-over clip that has been recorded. In the example illustrated in FIG. 11, the duration control 406 also changes in appearance to indicate the time remaining for the voice-over clip.

The third stage 1115 shows the composite display area 410 and teleprompter tool 405 after recording the voice-over clip. The playhead 455 is located on the timeline 460 that corresponds to an end point of the voice-over clip. The end point is represented by the out point of the 450 of the voice-over clip representation 495. As shown, the voice-over clip representation 495 has changed in appearance to indicate that it represents a recorded version of the voice-over clip. Also, as the voice-over clip has been recorded, the voice-over clip indication 465, including the in and out markers 470 and 475, is not displayed on the timeline 460.

In some embodiments, when an end point of the set time duration is reached, the media editing application automatically stops the recording of the voice-over clip. Alternatively, the media editing application may continue recording but stop when directed to by the application's user.

Figure 12:
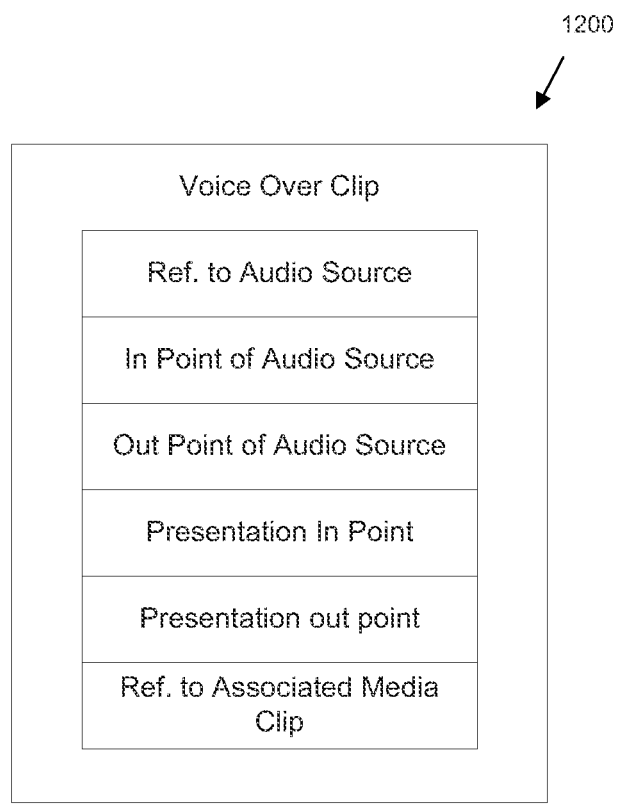
FIG. 12 conceptually illustrates an example data structure of a voice-over clip in a composite presentation.

When a voice-over clip is recorded, some embodiments store one or more data structure or metadata for the voice-over clip. In some embodiments, the data structure defines the timing of the voice-over clip within a composite presentation. FIG. 12 conceptually illustrates an example data structure 1200 of a voice-over clip in a composite presentation. In some embodiments, the data structure is stored as a part of project data of a composite presentation. As shown, the data structure includes a number of different data items. Specifically, the data structure includes a reference to an audio source file, an in point in the audio source file, an out point in the audio source file, a presentation in point, a presentation out point, and a reference to an associated media clip.

In some embodiments, the reference to the audio source file identifies a location or directory where the recorded audio clip or audio file is stored. The in and out points of the audio source specify starting and ending points within the audio clip. For instance, the in point of the audio source may specify that the voice-over clip starts 10 seconds into the recorded audio clip. Presentation in and out points correspond to in an out points such as the in and out points of the recorded voice-over clip shown in stage three 1115 of FIG. 11. The reference to an associated media clip references another clip in the composite presentation to which the audio clip is linked. In some embodiments, a voice-over clip may be linked to another clip in the composite presentation. For instance, the voice-over clip may be associated with a particular portion of a video clip such that if the video clip is moved in the composite presentation, the voice-over clip is moved with it (thereby modifying the presentation in and out points for the voice-over clip).

In the example described above, the data structure 1200 includes various data items related for a recorded audio clip. In some embodiments, the media editing application may not store one or more of these data items, or may store other data item in order to define the timing of the recorded audio clip in the composite presentation. For instance, the data structure 1200 may store a duration rather a presentation out point, as the presentation out point can be derived from the in point and the duration. The data structure for a voice-over clip may not include an association to another media clip, either because the voice-over clip is not linked to another clip or because such associations are not permitted by the media editing application.

B. Output Display Area

The previous section described the view of the composite display area during a recording session, including the changing appearance of a voice-over clip as the voice-over is recorded. The following section describes the output display area during a recording session, as text scrolls through the output display area. One of ordinary skill in the art would understand that in a full GUI of the media editing application of some embodiments, the composite display area would display the changing appearance of the voice-over clip as the text scrolls through the output display area of the teleprompter tool.

1. Start Off Screen Option

Figure 13:
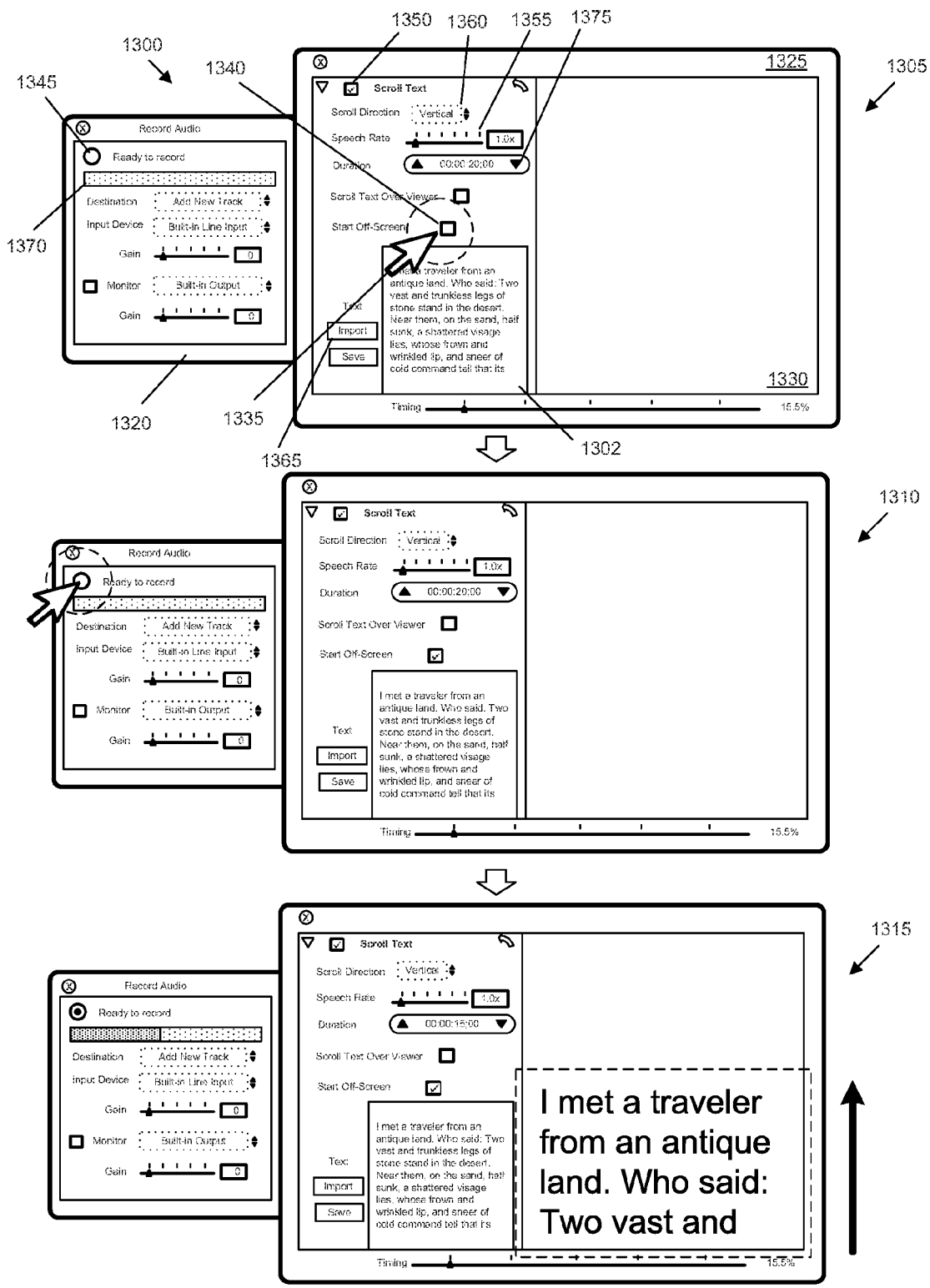
FIG. 13 illustrates scrolling text in an output display area of a voice-over tool.

FIG. 13 illustrates scrolling text in an output display area 1330 of a voice-over tool 1300. Specifically, this figure illustrates starting a recording session with output text starting off screen in the output display area 1330. Three operational stages 1305-1315 of the voice-over tool 1300 are shown in FIG. 13. The voice-over tool 1300 includes the audio recording tool 1320 and the teleprompter tool 1325. The audio recording tool 1320 and the teleprompter tool 1325 are similar to the ones described above by reference to FIG. 3.

The first stage 1305 shows the voice-over tool 1300 prior to a user's selection of the record button 1345. As shown, the text area 1302 includes input text to be outputted as output text in the display area 1330. The user might have inputted the text by typing, and/or copying and pasting the text directly into the text area 1302. As mentioned above, the text may also be inputted in the text area 1302 through an import operation (e.g., using the import button 1365).

In the first stage 1305, the scroll text option 1350 indicates that the text scrolling feature is activated. The speech rate setting is set at a "1.0×" rate as indicated by the text field of the speech rate controller 1355. Also, the scroll direction selector 1360 shows that the output text will be scrolled vertically. The cursor 1335 is placed over the start off screen option 1340. However, the start off screen option 1340 has not been activated.

The second stage 1310 shows the voice-over tool 1300 after activating the start off screen option 1340. In the example illustrated in FIG. 13, the start off screen option 1340 is a check box that indicates that the start off screen option is activated by displaying a check mark. However, one or more other user interface controls, keystrokes, and hotkeys may be provided to control the same option. In the second stage 1310, the cursor 1335 is placed over the record button 1345 to start the recording session.

The third stage 1315 shows the voice-over tool 1300 after the user's selection of the record button 1345 through the cursor 1335. Specifically, this third stage 1315 shows that the output text scrolls vertically in the display area 1330 of the teleprompter tool 1325. The output text starts off screen by starting from the bottom and scrolling vertically towards the top of the display area 1330. As shown by the duration control 1375, five seconds of the recording session have passed at this stage (as the duration control reads "15 seconds" rather than "20 seconds").

The audio meter 1370 of the audio recording tool 1320 displays the input audio level coming in through a selected or default input device (e.g., a microphone). At any time, the user can select the record button 1345 to pause or stop the recording session. In some embodiments, when a recording session is paused, the media editing application pauses the scrolling of text without removing the text from an output display area (e.g., the display area 1330). When the recording session is resumed, the media editing application may resume the scrolling of the text in the output display area.

2. Start on Screen Option

Figure 14:
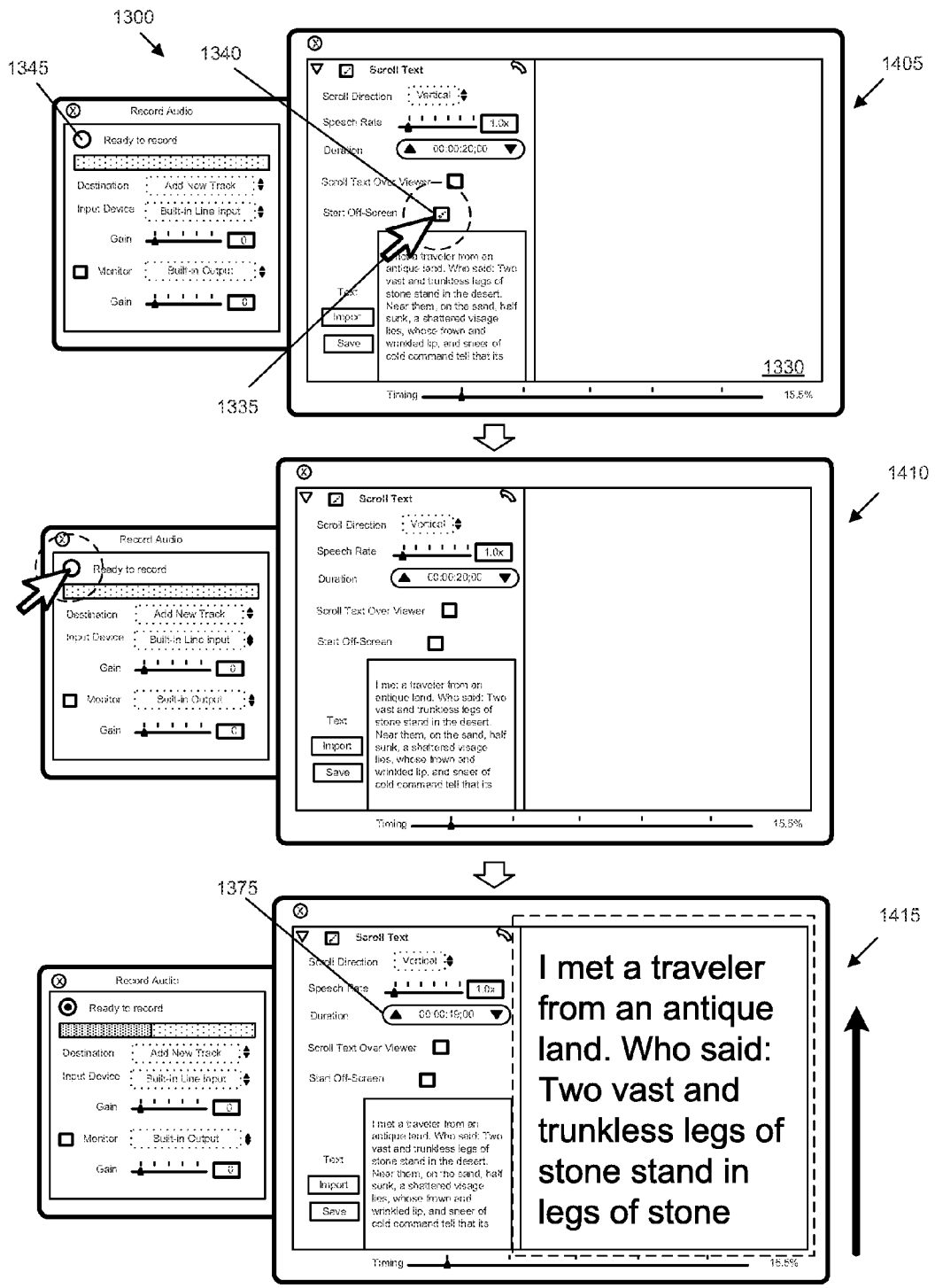
FIG. 14 illustrates starting a recording session with output text starting on screen.

In the previous example, the media application scrolls the output text in the display area 1330 by starting off screen. FIG. 14 illustrates starting a recording session with the output text starting on screen in the display 1330. Three operational stages 1405-1415 of the voice-over tool 1300 are shown in FIG. 14. These operational stages 1405-1415 are similar to the stages 1305-1315 in the example described above for FIG. 13. Specifically, in the first stage 1405, the cursor 1335 is placed over the start off screen option 1340 that is activated. The second stage 1410 shows the voice-over tool 1300 with the start off screen 1340 deactivated. Also, the cursor 1335 is placed over the record button 1345 to start the recording session. The third stage 1315 shows the voice-over tool 1300 after the user's selection of the record button 1345. In this example, as the start off screen 1340 is deactivated, a portion of the output text is initially displayed in the display area 1330 when the recording starts. As shown by the duration control 1375, one second of the recording session has passed at this stage (as the duration control reads "19 seconds" rather than "20 seconds"). As time elapses, the portion of the output text then scrolls out of the display area 1330 as another portion scrolls into the display area.

3. Scroll Direction Option

Figure 15:
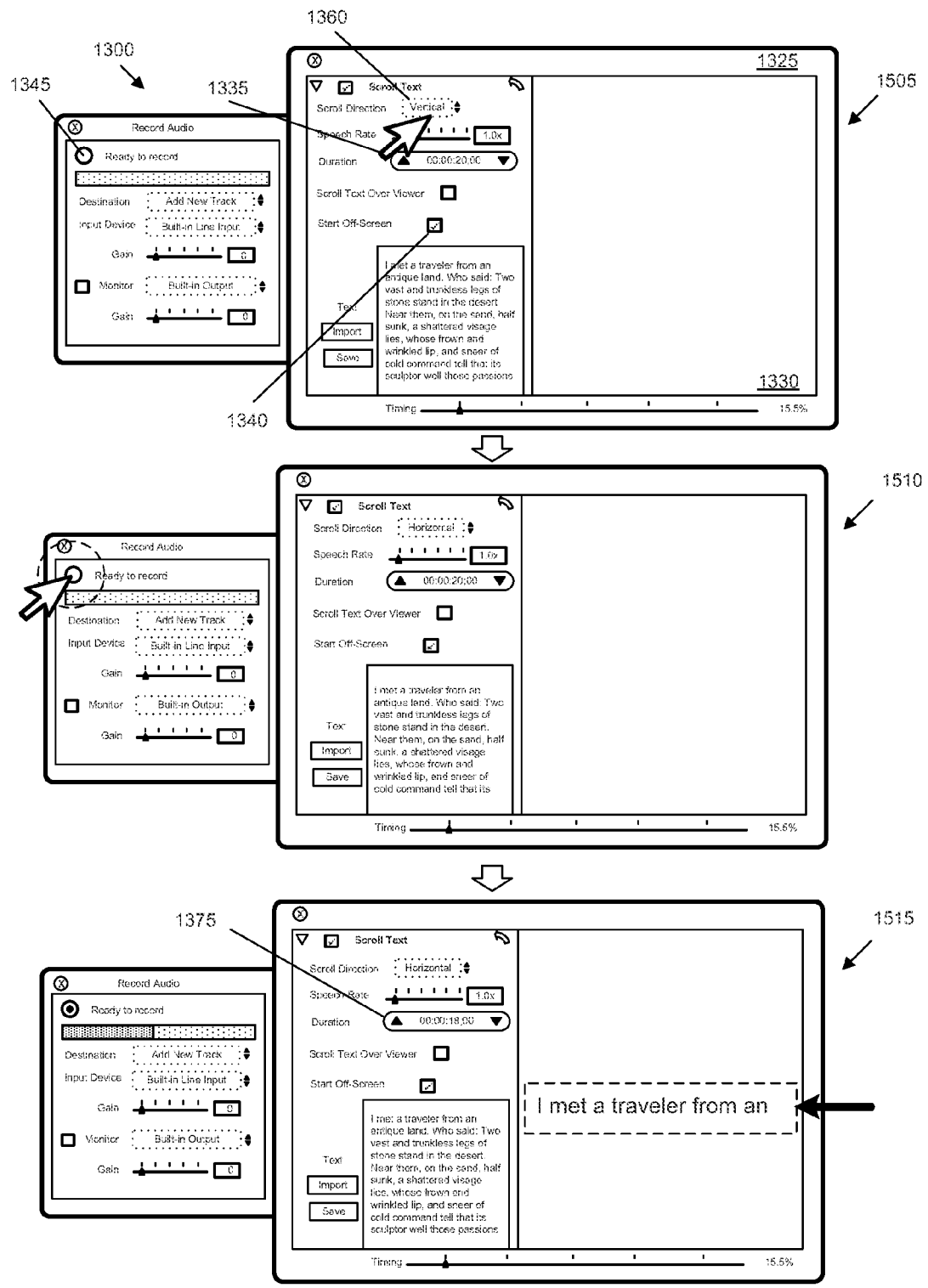
FIG. 15 illustrates scrolling output text horizontally in an output display area.

In the previous two examples, the output text is scrolled vertically in the display area 1330 of the voice-over tool 1300. FIG. 15 illustrates scrolling the output text horizontally in the output display area 1330. Three operational stages 1505-1515 of the voice-over tool 1300 are shown in FIG. 15. These operational stages 1505-1515 are similar to the example described above in FIG. 13.

The first stage 1505 shows the voice-over tool 1300 prior to a user's selection of the record button 1345. Specifically, the scroll direction selector 1360 indicates that the output text will be scrolled vertically. However, the cursor 1335 is placed over the scroll direction selector 1360 to change the output scroll direction. Also, the start off screen option 1340 indicates that the output text will initially start off screen.

The second stage 1510 shows the voice-over tool 1300 after changing the scroll direction from vertical to horizontal using the scroll direction selector 1360. The cursor 1335 is placed over the record button 1345 to start the recording session.

The third stage 1315 shows the voice-over tool 1300 after the user's selection of the record button 1345. Specifically, this third stage 1315 shows that the output text scrolls horizontally on the display area 1330 of the teleprompter tool 1325. The output text starts off screen by starting from the right side of the display area 1330 and scrolling horizontally towards the left side. As shown by the duration control 1375, three seconds of the recording session have passed at this stage (as the duration control reads "17 seconds" rather than "20 seconds"). In some embodiments, when the starts off screen option is deactivated, a portion of the output text is initially displayed in the display area 1330 when the recording starts. As recording time elapses, the portion of the output text then scrolls horizontally out of the display area 1330 as another portion scrolls into the display area.

In the example described above, output text is scrolled vertically starting from the bottom and moving towards the top of the display area 1330, or scrolled horizontally starting from the right and moving towards the left. However, the output text may be moved in opposite directions (e.g., top to bottom, left to right).

C. Preview Display Area

Figure 16:
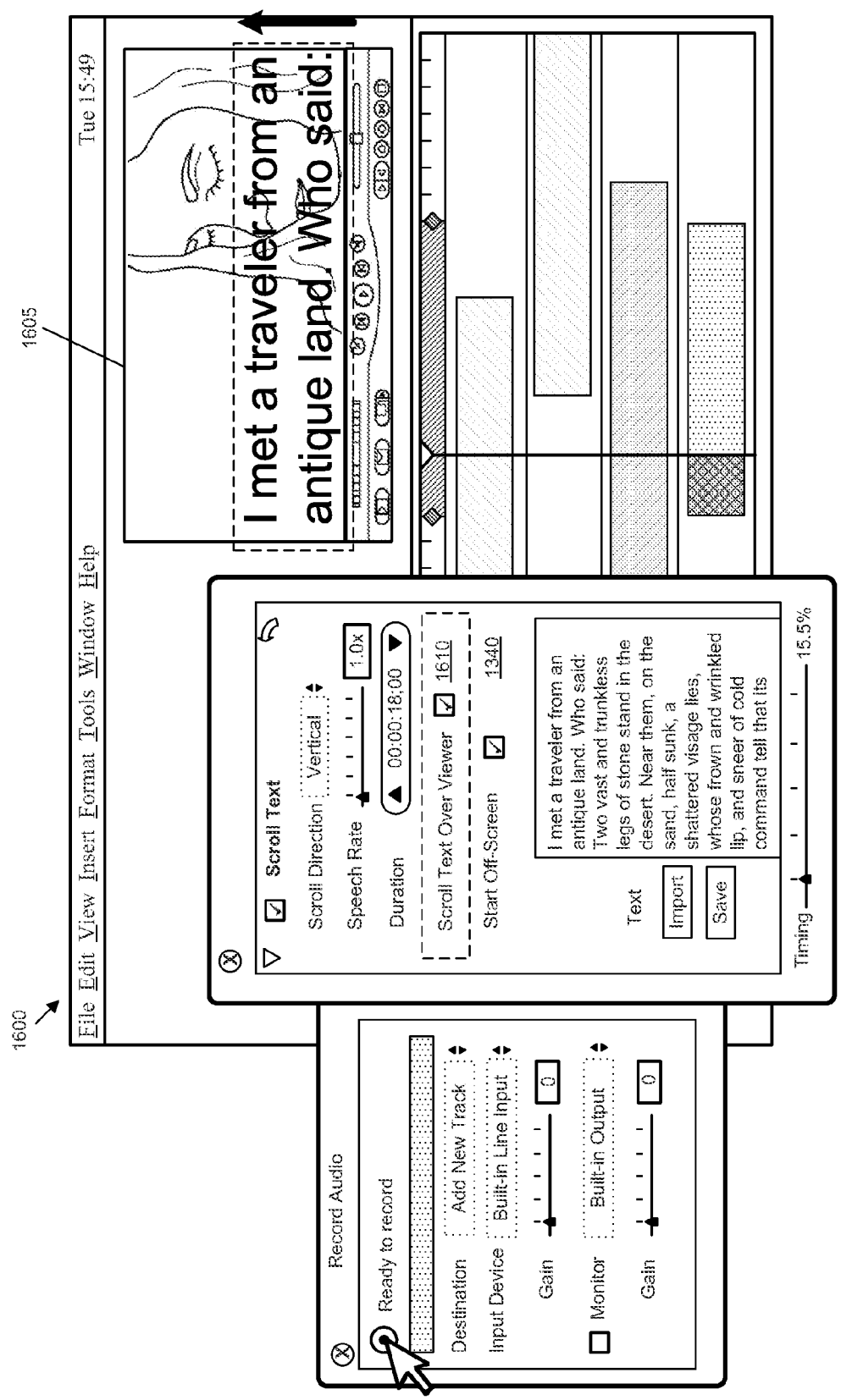
FIG. 16 illustrates scrolling output text in a preview display area.

In the examples described above in FIGS. 13-15, the output text is scrolled in the display area 1330 of the voice-over tool 1300. FIG. 16 illustrates scrolling output text in a preview display area 1605. This example is similar to the example described above in FIG. 13. However, in this example, a user chooses the preview display area as the teleprompter display using the output selector 1610. The selection causes output text to scrolls vertically on the preview display area 1605 of the media editing application 1600. As the start off screen option 1340 is activated, the output text starts off screen by starting from the bottom of the preview display area 1605 and scrolling vertically towards the top of the preview display area 1605. Also, similar to the example described above in FIG. 11, the recorded clip representation populates the composite display area.

D. Remote Display Areas

Figure 17:
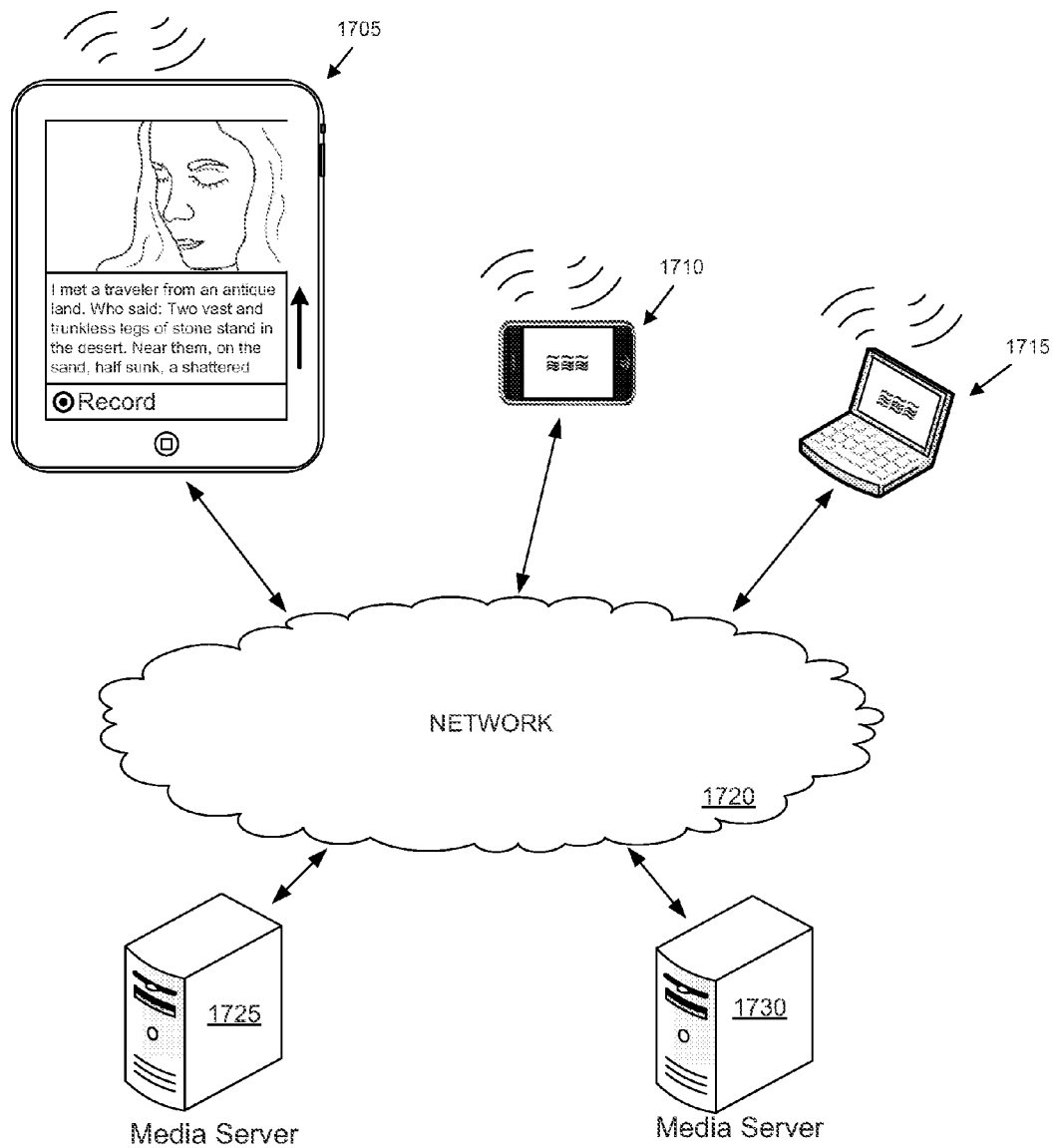
FIG. 17 conceptually illustrates displaying output text on several remote devices.

In FIGS. 13-16, several different display areas of the media editing application are used to display output text. In these examples, the output text is displayed on the same device as the media editing application, and the audio is also recorded at this device. Some embodiments enable display and recording at a remote device (e.g., a tablet device, a smart phone, etc.). FIG. 17 conceptually illustrates displaying output text on several remote devices. The figure includes several media servers (1725 and 1730) and several client devices (1705-1715).

The media servers 1725 and 1730 send voice-over data over a network 1720 (e.g., local area network, the Internet) to the client devices 1705-1715. In some embodiments, the media server (1725 or 1730) is a server for creating the composite presentation using a media editing application that includes the teleprompter tool. An example media editing application with such teleprompter tool is described above by reference to FIGS. 2 and 3.

The client devices use the voice-over data to display the voice-over text when recording voice-over content. In some embodiments, the client device 1705 stores and executes a client application for receiving and displaying voice-over text from the media server 1725. Some embodiments use a variety of different client devices to display the output text. Here, the embodiment uses a tablet device 1705, a smart phone 1710, and a laptop 1715.

Figure 18:
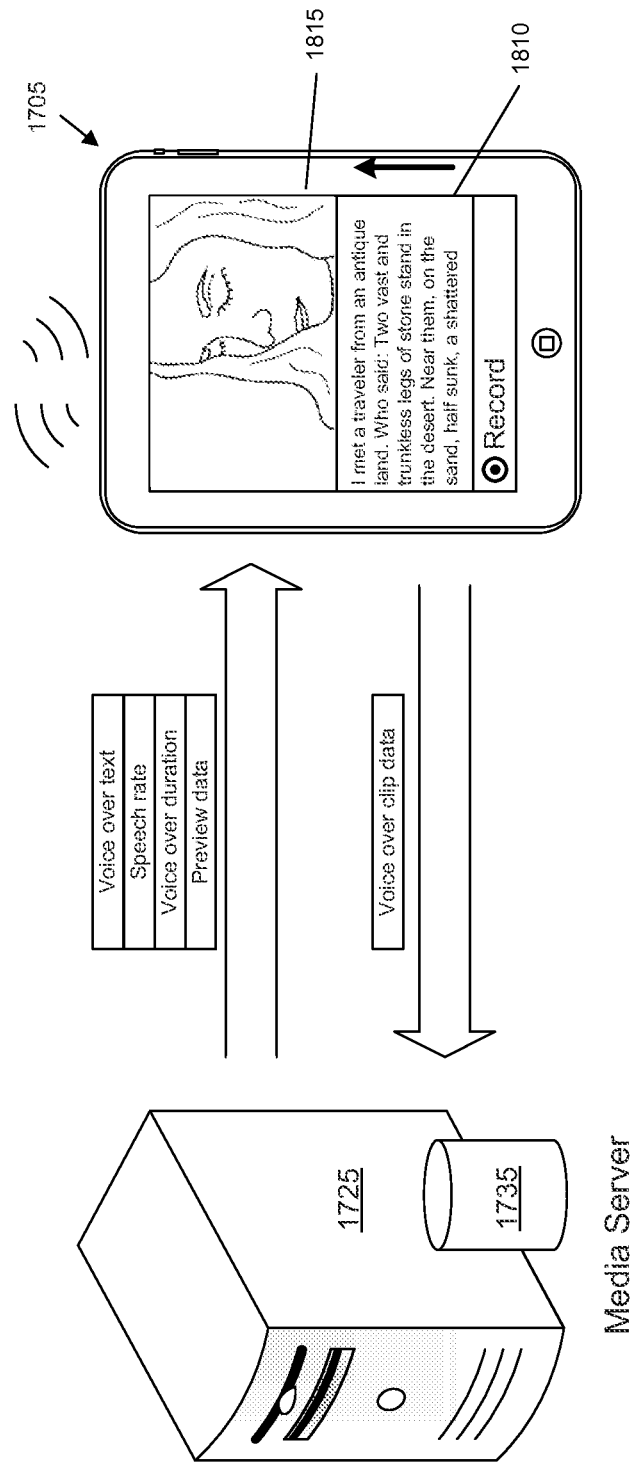
FIG. 18 conceptually illustrates a media server interacting with a client device to record voice-over content for a composite presentation.

FIG. 18 conceptually illustrates the media server 1725 interacting with the client device 1705 to record voice-over content for a composite presentation. The media server 1725 includes a storage 1735 that store voice-over data related the composite presentation. In FIG. 18, the media server 1725 retrieves voice-over data from the storage 1735 and sends the data to the client device 1705. As shown, the voice-over data includes (1) voice-over duration that defines the duration of the voice-over clip, (2) voice-over text, and (3) speech rate settings that defines how the voice-over text is presented.

As shown in FIG. 18, the media server 1725 may also send preview data to the client device 1705. The preview data allow a preview of a composite presentation to be displayed in a display area 1815 of the client device 1705. In some embodiments, when recording the voice-over clip, the preview is displayed with the output text. This allows a narrator to watch the preview and read the script at the same time in order to match the timing of the voice-over with the displayed preview. In some embodiments, the voice-over data includes other items or excludes one or more items listed above. For instance, the media server 1725 may not send the preview data to the client device 1705 for bandwidth reasons. Also, instead of the speech rate, a scroll rate that defines the rate at which output text scrolls may be sent to the client device 1705.

In the example illustrated in FIG. 18, the client device 1705 receives the voice-over data and performs the recording operation. Specifically, when the record button is selected, the client device 1705 records the voice-over clip while scrolling voice-over text in the display area 1810. As shown, the output display area 1810 is separate from the preview display area 1815. However, the output text may be displayed over the preview in the preview display area 1815, as described above by reference to FIG. 16. After recording the voice-over clip, the client device 1705 sends the voice-over clip to the media server. In some embodiments, the media server receives the voice-over clip and displays a representation of the voice-over clip in a composite display area with other data related to the composite presentation. In some embodiments, the recording operation is performed at the media server 1725. For instance, the client device 1705 may capture audio data through a microphone and send the data over the network to the client device 1705 that performs the recording operation. Alternatively, or conjunctively, a media server may be locally connected (e.g., wired) to another area with a microphone and a display device (e.g., in a sound booth for recording the voice-over).

IV. Processes

The preceding sections described several example timing and recording operations. Several example processes will now be described by reference to FIGS. 19 and 20.

A. Process for Displaying Timing References

Figure 19:
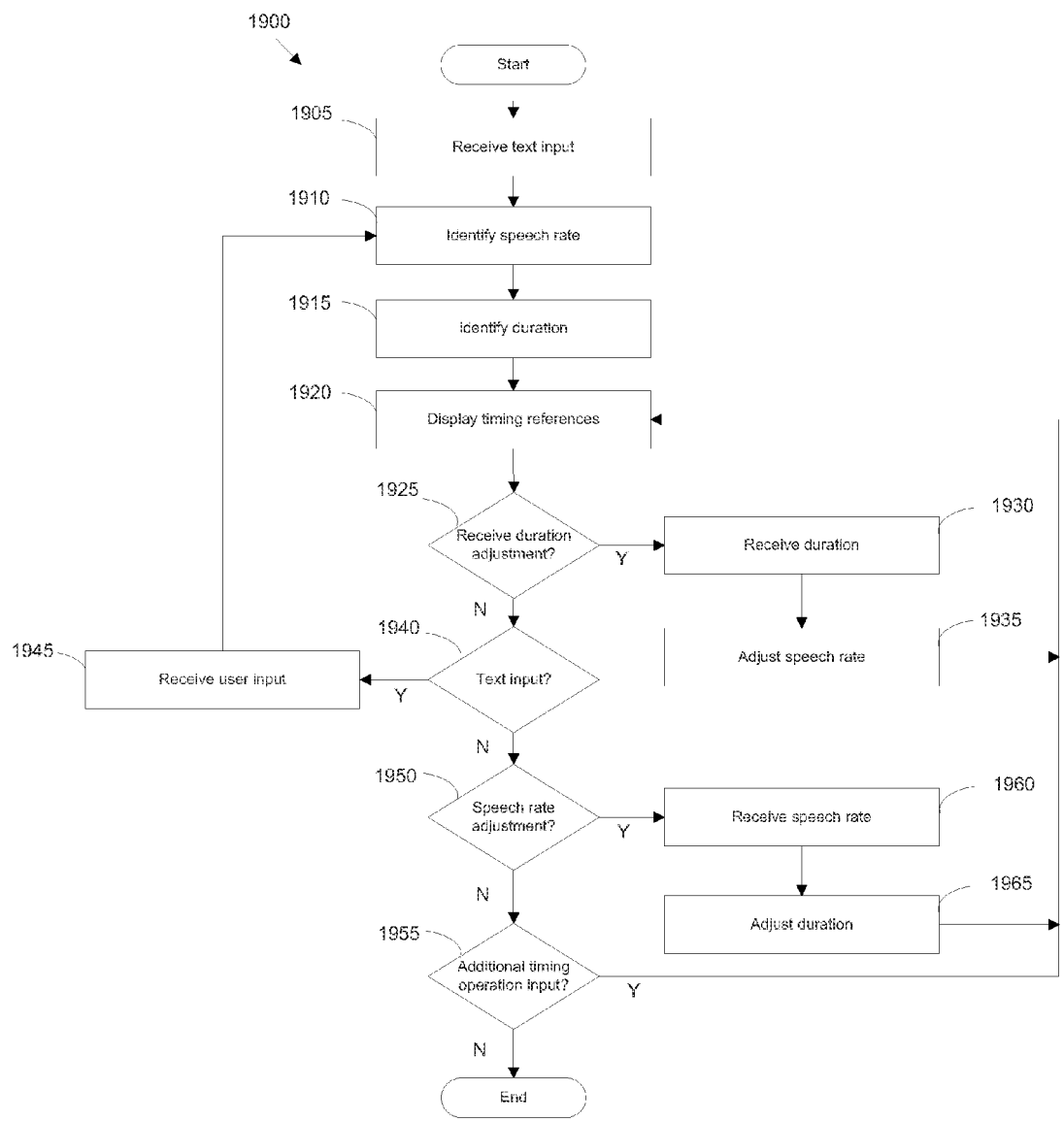
FIG. 19 conceptually illustrates a process for displaying timing references according to some embodiments of the invention.

FIG. 19 conceptually illustrates a process 1900 for displaying timing references for a voice-over clip according to some embodiments of the invention. In some embodiments, the process 1900 is performed by a media editing application prior to recording the voice-over clip.

The process 1900 starts when it receives (at 1905) text input. The process 1900 then identifies (at 1910) a speech rate. In some embodiments, the identified speech rate is a manually set speech rate as shown in FIG. 5. Alternatively, the speech rate is an automatically set speech rate as shown in FIGS. 6-9.

The process 1900 then identifies (at 1915) a duration for the voice-over clip. In some embodiments, the estimation is based on a time that an average speaker takes to read aloud a given number of words (e.g., one or more words) multiplied by the number words in the input text. Different embodiments of the invention compute this estimation differently. For instance, the media editing application may count the number of letters, syllables (e.g., combination of consonants and vowels), words, and/or any combination of these variables; and compute the estimated time duration. Some embodiments take into account the speech rate when estimating a duration for a voice-over clip. The association between the speech rate and the estimated duration is described above by reference to FIGS. 5-7.

In some embodiments, when a user manually sets a duration for a clip, the media editing application halts the automatic estimation of the time duration for the voice-over clip. The media application may resume the automatic estimation when directed to by the user. In some such embodiments, the duration identified at 1915 is a manually set duration and not an estimated duration determined by the media editing application.

At 1920, the process 1900 display one or more timing references. Example timing references include the voice-over clip indication and voice-over clip representation shown in FIGS. 4-11. The process 1900 then determines (at 1925) whether the duration for the voice-over clip is adjusted. Several different techniques for adjusting the duration are described above. For instance, FIGS. 6 and 7 show examples of adjusting the duration by adjusting markers of a voice-over clip representation. Also, FIG. 8 shows adjusting the duration by inputting a time into a duration control.

When the duration is adjusted, the process 1900 proceeds to 1930. The process 1900 receives (at 1930) a duration for the voice-over clip. The process 1900 then adjusts (at 1935) the speech rate based on the received duration (i.e., lowering the speech rate when the duration is increased, or vice versa). Examples of modifying the speech rate based on duration adjustment are described above by reference to FIGS. 6 and 7. The process 1900 then returns to 1920.

When the duration is not adjusted, the process 1900 proceeds to 1940. The process 1900 determines (at 1940) whether the voice-over text is modified (e.g., additional text is entered, text is deleted, the text is otherwise edited, etc.). When the text is modified, the process proceed to 1945. The process 1900 receives (at 1945) user input (i.e., the text modification) and returns to 1910 to adjust the voice-over parameters. When the text is not modified, the process 1900 proceeds to 1950.

The process 1900 then determines (at 1950) whether the speech rate has been adjusted. When the speech rate has been adjusted, the process receives (at 1960) a speech rate for the voice-over clip. The process 1900 then adjusts (at 1965) the duration base on the adjusted speech rate (i.e., lowering the duration when the speech rate is increased, or vice versa). An example of modifying the duration based on speech rate adjustment is described above by reference to FIG. 5. The process 1900 then returns to 1920.

When the determination is made that the speech rate is not adjusted, the process 1900 proceeds to 1955. The process listens at 1955 for additional timing operation input (e.g., text input, speech rate adjustment, duration adjustment). When the determination is made that there is no addition timing operation input (e.g., when a user selects a record button, closes a media project, closes the media editing application, etc.), the process 1900 then ends.

B. Process for Scrolling Text

Figure 20:
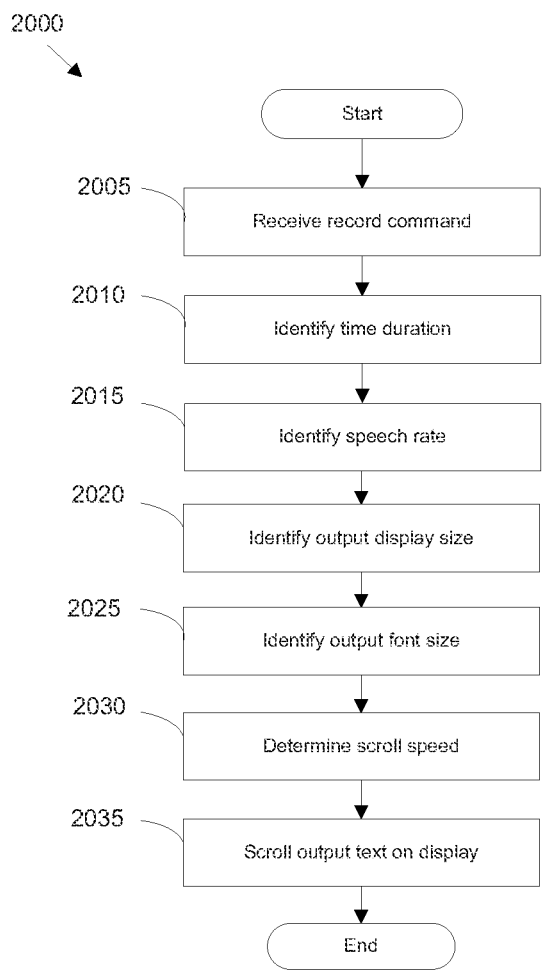
FIG. 20 conceptually illustrates a process in some embodiments for scrolling voice-over text in an output display area.

FIG. 20 conceptually illustrates a process 2000 in some embodiments for scrolling text in an output display area. In some embodiments, the process 2000 is performed by a media editing application. The process 2000 starts when it receives (at 2005) a record command. For instance, a user might select a record button as shown in FIGS. 13-16. The process 2000 then identifies (at 2010) a time duration. In some embodiments, the time duration is an automatically estimated duration. Examples of automatically set time duration is described above by reference to FIGS. 4 and 5. Alternatively, the time duration may be a manually set duration, as described above by reference to FIGS. 6-9.

The process 2000 then identifies (at 2015) a speech rate. As mentioned above, the speech rate defines the rate at which output text is presented in an output display area. In some embodiments, the identified speech rate is a manually set speech rate as shown in FIG. 5. Alternatively, the speech rate is an automatically set speech rate as shown in FIGS. 6-9.

At 2020, the process 2000 then identifies the display size of the output display area. In some embodiments, the output display size is a current display size. For instance, the output display area may change in size a number of times after it is opened. The current size reflects the size of the output display area as it is currently displayed on a display device. Several examples of different output display areas are described above in Section III.

At 2025, the process 2000 identifies the output font size for displaying the output text. In some embodiments, the font is a default font (e.g., of a theme setting) or a user specified font for displaying output text. Similarly, the font size may be a default size or one specified by the user. The process 2000 then determines (at 2030) the scroll speed based on the identified time duration, speech rate, display size, and font size. In some embodiments, the scroll speed is set such that a first line of a script appears in a display area just as the duration begins and the last line of the script disappears just as the duration ends.

After determining the scroll speed, the process (at 2035) scrolls the output text in the output display area. In some embodiments, the output text is scrolled over a preview of a composite presentation as mentioned above. This provides a narrator with several different visual cues (e.g., scrolling text effect, a video preview) to match the timing of the voice-over with the composite presentation. After scrolling the text, the process 2000 then ends.

V. Software Architecture

A. Example Architecture

Figure 21:
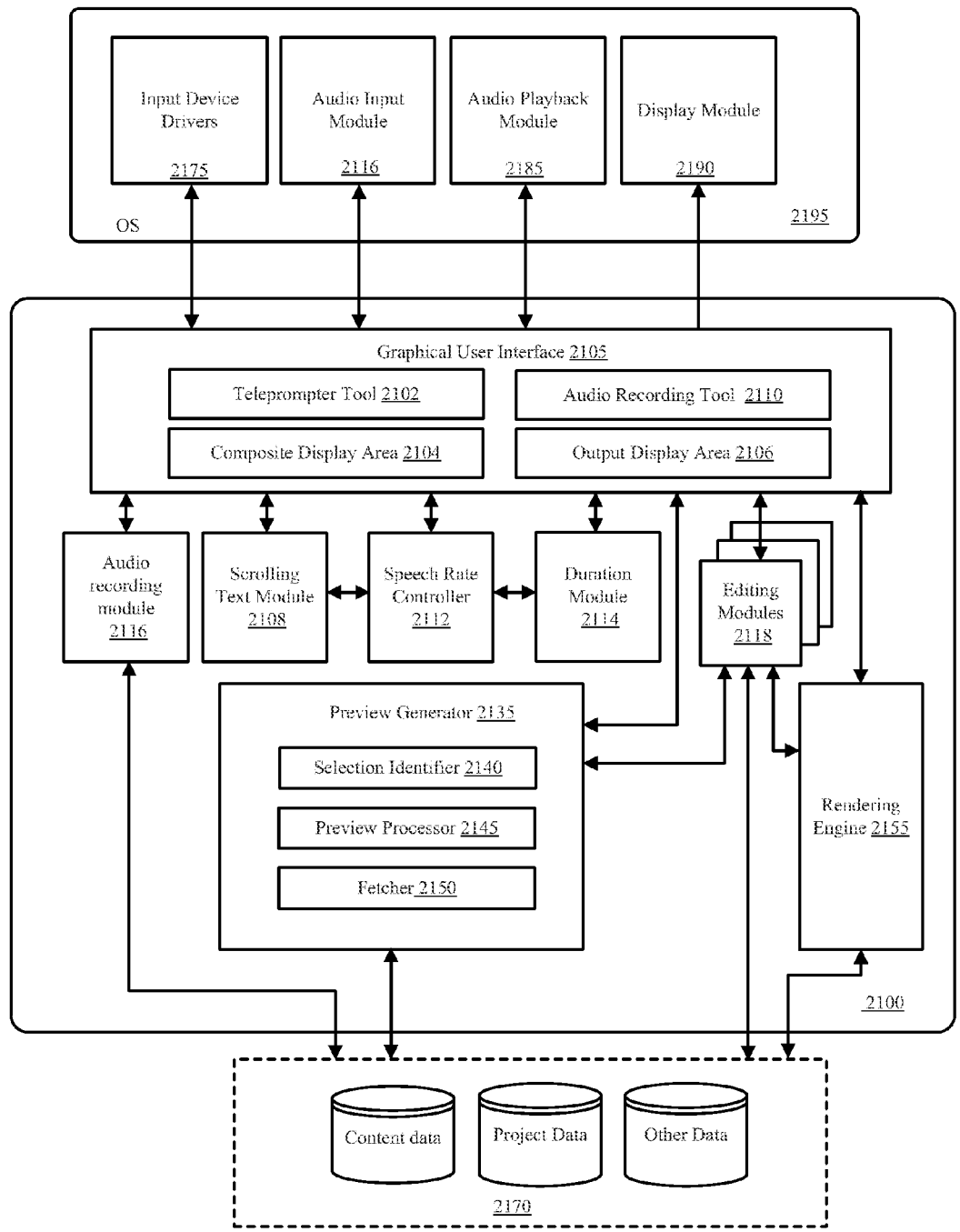
FIG. 21 conceptually illustrates the software architecture of an application 2100 in accordance with some embodiments.

In some embodiments, the above-described operations and user-interface tools are implemented as software running on a particular machine, such as a desktop computer, laptop, or handheld device, (or stored in a computer readable medium). FIG. 21 conceptually illustrates the software architecture of an application 2100 in accordance with some embodiments. In some embodiments, the application 2100 is a media editing application for creating a media presentation using one or more media clips. (e.g., audio clip, video clip, text overlay, picture, and/or other media).

In some embodiments, the application 2100 is a standalone application or is integrated into another application (for instance, application 2100 might be a portion of a media editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine. In still other embodiments, the components (e.g., tools, engines, modules) illustrated in FIG. 21 are split among multiple applications. For instance, in some embodiments, one application defines a voice-over clip to record, while another application (e.g., client application) scrolls output text in a display area.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

As shown in FIG. 21, the application 2100 includes a graphical user interface 2105, a scrolling text module 2108, a speech rate controller 2112, a duration module 2114, a set of one or more editing modules 2118, an audio recording module 2116, a preview generator 2135, and a rendering engine 2155. The graphical user interface 2105 provides user-interface tools (e.g., display areas, user-interface controls, etc.) that a user of the application 2100 interacts with in order to create composite presentations. As shown in FIG. 21, the graphical user interface includes an audio recording tool 2110, a teleprompter tool 2102, an output display area 2106, and a composite display area 2104.

The audio recording tool 2110 provides several different user-interface controls to record audio clips with the application 2100. These controls may include a record button, a destination selector, an audio meter, several gain level controls (e.g., input gain level control, output gain level control), etc. Several example controls of such audio recording tool 2110 is described above by reference to FIG. 3.

The teleprompter tool 2102 controls the teleprompter feature of the application 2100. In some embodiments, the teleprompter tool 2102 includes a text area for receiving input text, a speech rate controller for controlling the rate at which the input text scroll in an output display area, and a duration controller for setting the duration for a voice-over clip. These and several other user interface items of such teleprompter tool 2102 is described above in FIG. 3. In some embodiments, the audio recording tool and the teleprompter tool are two components of a voice-over tool. For instance, the teleprompter tool 2102 may be an optional component of the voice-over tool that appears when a user selects a selectable option in the audio recording tool 2110.

The composite display area 2104 displays one or more media clips that are part of a composite presentation. In some embodiments, the composite display area is an area in the graphical user interface 2105 that includes multiple tracks that span a timeline. In some embodiments, the composite display area 2104 displays one or more timing references for a voice-over clip to be recorded. Examples of such timing references are a voice-over clip indication and voice-over clip representation described above by reference to FIGS. 4-11.

The output display area 2106 functions as a teleprompter display during the audio recording phase. In some embodiments, the output display area 2106 presents text inputted into a text area of the teleprompter tool 2102. The output display area 2106 is a display area of the teleprompter tool 2102 in some embodiments. Alternatively, or conjunctively, the output text may be presented elsewhere in one or more other display area (e.g., a preview display area that displays the output text and a composite presentation's preview at the same time). In some embodiments, when output text is displayed remotely, the output display area 2106 is a part of a graphical user interface of a client application running on a remote device (e.g., tablet device, smart phone, laptop). Several examples of remote output display areas are described above by reference to FIGS. 17 and 18.

In some embodiments, the duration module 2114 calculates an estimated duration for a voice-over script. For instance, when input text is received, the duration module 2114 determines an estimated time that it would take for a narrator to read the input text. In some embodiments, the estimation is based on a time that an average speaker takes to read aloud a given number of words (e.g., one or more words) multiplied by the number words in the input text. The duration module 2114 in some embodiments also allows a user to manually adjust duration for a voice-over clip. For instance, the time duration may be set using a duration control, a voice-over clip representation, voice-over clip indication, etc.

The speech rate controller 2112 controller defines the rate at which output text is presented in an output display area such as the preview display area. In some embodiments, the speech rate is defined by counting the number of words in the input text over a set duration. For instance, the speech rate may be defined as x number of words per second or minute. In some embodiments, a corresponding user interface controller is provided as a control of the teleprompter tool. A user of the application 2100 can use this control to granularly adjust the presentation of the output text in the output display area 2106. In this way, the user can match not only match the timing of the voice-over clip with another clip but also match the presentation of output text to match the natural speaking rate or speech rate of a narrator.

The scrolling text module 2108 is a module of the application 2100 that scrolls text in the output display area 2106. In some embodiments, this module receives different parameters to scroll the output text. Several example parameters that the scroll text module takes into account when scrolling text in the output display area 2106 include time duration parameter, a scroll direction parameter, output display size parameter, font parameter, font size parameter, and speech rate setting.

The audio recording module 2116 facilitates the recording of audio clips with the application 2100. To record audio clips, the module may work in independently and/or conjunction with different digital audio recording and processing mechanisms included in an operating system. The audio recording module 2116 may also work in conjunction with a third party recording program to implement the audio recording feature. In some embodiments, the audio recording tool 2110 defines how the audio recording module 2116 records an audio clip. For instance, the audio recording tool 2110 allows a user to select an input device and specify a gain level for the selected input device.

The editing modules 2118 provides different editing features for the application 2100. In some embodiments, these modules support the various editing tools for editing composite presentations. As one example, the module may include a trim module for supporting a trim tool that can be used to modify in and out points of media clips of a composite presentation. Also, the modules may include modules for superimposing several clips (e.g., to add subtitles for the voice-over), defining keyframes (e.g., to identify key transitional points for a media clip), performing filtering operations (e.g., audio filter, video filter), performing color adjustment, etc.

The preview generator 2135 in some embodiments generates a preview (e.g., real-time preview) of a composite presentation that is being created by the application 2100. As shown in FIG. 21, the preview generator 2135 in some embodiments includes a preview processor 2145. In some embodiments, the preview processor 2145 sends and receives data (e.g., project data) to and from the graphical user interface 2105 and/or the set of data storages 2170. In addition, the preview processor 2145 may send and receive data to and from a section identifier 2140 and/or a fetcher 2150. In some embodiments, the preview processor 2145 sends timeline data to the section identifier 2140 that generates an appropriate set of data (e.g., a segment table) needed to generate the preview. In some embodiments, the preview processor 2145 supplies the set of data generated by the section identifier 2140 to the fetcher 2150. The fetcher 2150 of some embodiments retrieves content data (e.g., video frame data, audio sample data) from the set of data storages 2170 based on the set of data provided by the preview processor 2145. The preview generator 2135 in some embodiments receives and uses the content data in order to generate the preview. In some embodiments, the preview generator 2135 operates in conjunction with the scrolling text module 2108 to display output text overlaid or superimposed over a preview.

Rendering engine 2155 enables the storage and/or output of audio and video from the application 2100. For instance, the rendering engine 2155 may use one or more clips and their associated project data to render a composite presentation for display and/or storage.

As shown in FIG. 21, the operating system 2195 includes the input device drivers 2175, an audio playback module 2185, an audio input module 2116, display module 2190. The input device drivers 2175 may include drivers for translating signals from a keyboard, mouse, touchpad, tablet, touch screen, etc. A user interacts with one or more of these input devices, which send signals to their corresponding device driver. The device driver then translates the signals into user input data. Through the graphical user interface 2105, the input data in some embodiments are received by one or more the various different modules or controllers (e.g., audio recording module, speech rate controller) of the application 2100.

In some embodiments, the audio playback module 2185 processes audio data that will be supplied to an audio device (e.g., a soundcard and loud speakers). The display module 2190 processes video data that will be supplied to a display device (e.g., a monitor). The audio input module 2116 in some embodiments interfaces with different audio input devices (e.g., microphone).

An example operation of the application 2100 will now be described by reference to the components (e.g., interfaces, modules) illustrated in FIG. 21. To create a composite presentation, a user interacts with the graphical user interface 2105 of the application 2100 via input devices such as a cursor controller (e.g., a mouse, touchpad, touch screen, etc.) and keyboard (e.g., physical keyboard, virtual keyboard).

The audio recording tool 2110 provides several different user-interface controls to record audio clips with the application 2100. The teleprompter tool 2102 controls the teleprompter feature of the application 2100. In some embodiments, the user can input text for a voice-over clip using the teleprompter tool 2102.

Once text is inputted, the text duration estimator 2114 in some embodiments estimates the duration of the voice-over clip. In some embodiments, the estimated duration is represented as one or more timing references in the composite display area 2104. Prior to recording the voice-over clip, the user can perform a number of different timing operations using these timing references. Several example operations are described above by reference to FIGS. 4-10.

In some embodiments, a user's selection of the record button in the audio recording tool 2110 starts the audio recording session and the scrolling of output text in the output display area 2106. The audio recording module 2116 records audio data coming in through a selected input device and stores the data in a storage.

During the recording session, the output display area 2106 displays the output text according to one or more options specified through the teleprompter tool 2102. When the scrolling text feature is enabled, the scrolling text module 2108 controls how the output text scrolls in the output display area 2106. In some embodiments, the output display area 2106 also displays a preview of the composite presentation that the preview generator 2135 generates. This allows a narrator to match the timing of the voice-over clip with the preview displayed in the output display area 2106.

B. Process for Defining an Application

Figure 22:
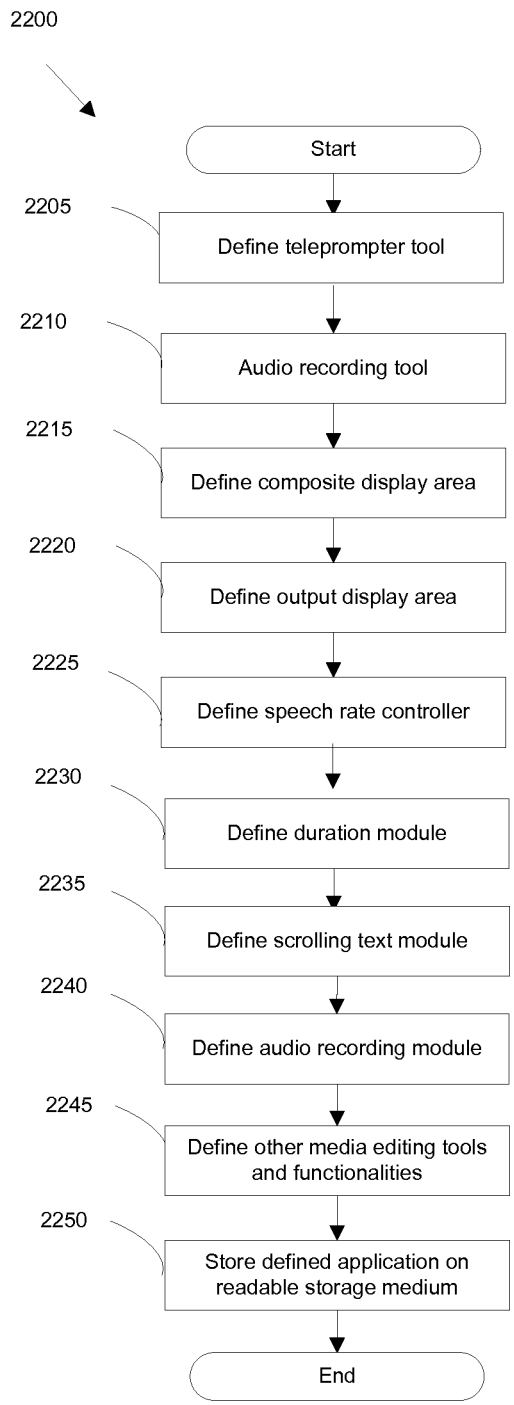
FIG. 22 conceptually illustrates a process of some embodiments for defining an application.

The section above described and illustrated the software architecture of an application in accordance with some embodiments. FIG. 22 conceptually illustrates a process 2200 of some embodiments for defining an application, such as application 2100. As shown, the process 2200 defines (at 2205) a teleprompter tool such as the teleprompter tool 2102. The process 2200 then defines (at 2210) an audio recording tool (e.g., the audio recording tool 2110).

The process 2200 then defines (at 2215) a composite display area. The composite display area 2104 is an example of such a display area. At 2220, the process 2200 defines one or more output display areas (e.g., the output display area 2106). The process 2200 then defines (at 2225) a speech rate controller. The speech rate controller 2112 is an example of such speech rate controller.

At 2230, the process 2200 defines a duration module. The duration module 2114 is an example of such duration module. The process 2200 then defines (at 2235) a scrolling text module (e.g., the scrolling text module 2108). The process 2200 then defines define (at 2240) an audio recording module such as the audio recording module 2116.

The process 2200 next defines (at 2245) other media editing tools and functionalities. After 2245, the application is defined. Accordingly, at 2250, the process 2200 stores a representation of the application in a readable storage medium. The readable storage medium may be a disk (e.g., CD, DVD, hard disk, etc.) or a solid-state storage device (e.g., flash memory) in some embodiments. The process 2200 then ends.

One of ordinary skill in the art will recognize that the various modules and UI items defined by process 2200 are not exhaustive of the modules and UI items that could be defined and stored on a computer readable storage medium for an editing application incorporating some embodiments of the invention.

VI. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 23:
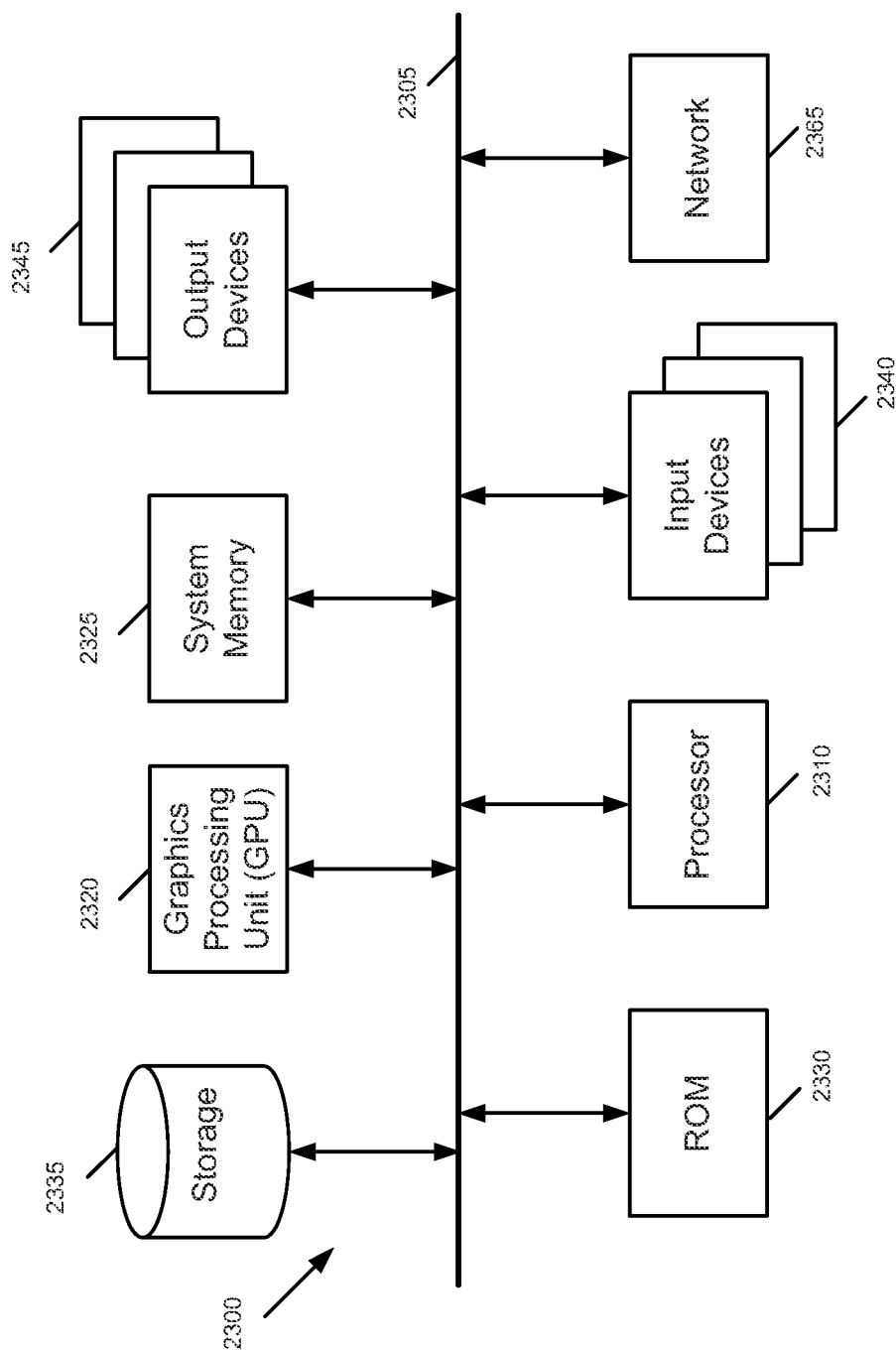
FIG. 23 illustrates a computer system with which some embodiments of the invention are implemented.

FIG. 23 illustrates a computer system with which some embodiments of the invention are implemented. Such a computer system includes various types of computer readable media and interfaces for various other types of computer readable media. Computer system 2300 includes a bus 2305, at least one processing unit (e.g., a processor) 2310, a graphics processing unit (GPU) 2320, a system memory 2325, a read-only memory 2330, a permanent storage device 2335, input devices 2340, and output devices 2345.

The bus 2305 collectively represents all system, peripheral, and chipset buses that communicatively connect the numerous internal devices of the computer system 2300. For instance, the bus 2305 communicatively connects the processor 2310 with the read-only memory 2330, the GPU 2320, the system memory 2325, and the permanent storage device 2335.

From these various memory units, the processor 2310 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 2320. The GPU 2320 can offload various computations or complement the image processing provided by the processor 2310. In some embodiments, such functionality can be provided using CoreImage's kernel shading language.

The read-only-memory (ROM) 2330 stores static data and instructions that are needed by the processor 2310 and other modules of the computer system. The permanent storage device 2335, on the other hand, is a read-and-write memory device. This device is a non-volatile memory unit that stores instructions and data even when the computer system 2300 is off. Some embodiments of the invention use a mass storage device (such as a magnetic or optical disk and its corresponding disk drive) as the permanent storage device 2335.

Other embodiments use a removable storage device (such as a floppy disk, flash drive, or ZIP® disk, and its corresponding disk drive) as the permanent storage device. Like the permanent storage device 2335, the system memory 2325 is a read-and-write memory device. However, unlike storage device 2335, the system memory is a volatile read-and-write memory such as a random access memory. The system memory stores some of the instructions and data that the processor needs at runtime. In some embodiments, the invention's processes are stored in the system memory 2325, the permanent storage device 2335, and/or the read-only memory 2330. For example, the various memory units include instructions for processing multimedia items in accordance with some embodiments. From these various memory units, the processor 2310 retrieves instructions to execute and data to process in order to execute the processes of some embodiments.

The bus 2305 also connects to the input and output devices 2340 and 2345. The input devices enable the user to communicate information and commands to the computer system. The input devices 2340 include alphanumeric keyboards and pointing devices (also called "cursor control devices"). The output devices 2345 display images generated by the computer system. The output devices include printers and display devices, such as cathode ray tubes (CRT) or liquid crystal displays (LCD).

Finally, as shown in FIG. 23, bus 2305 also couples the computer 2300 to a network 2365 through a network adapter (not shown). In this manner, the computer can be a part of a network of computers (such as a local area network ("LAN"), a wide area network ("WAN"), an intranet, or a network of networks such as the Internet. Any or all components of computer system 2300 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, many of the media editing application GUIs illustrated in the Figures show only a composite display area and a teleprompter tool. One of ordinary skill in the art will understand that the features illustrated in these figures may be incorporated into a more complete media editing GUI such as illustrated in FIG. 2.

In addition, a number of the Figures (including FIGS. 19 and 20) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a media editing application that when executed by at least one processing unit provides a graphical user interface (GUI) for creating a composite media presentation from a plurality of media clips, the GUI comprising:
   a set of editing tools to define the composite media presentation that includes a set of media clips;
   a composite display area for displaying representations of the clips that are in the composite media presentation;
   a voice over tool to receive text for a voice over clip, record the voice over clip, and add the voice over clip to the composite display area, wherein, prior to recording of the voice over clip, a size of a representation of the voice over clip in the composite display area is determined based on the received text; and
   at least one output tool to output the composite media presentation with the set of media clips and the voice over clip recorded with the voice over tool.

2. The non-transitory machine readable medium of claim 1, wherein the GUI further comprises a text display area to scroll the voice over text during the recording of the voice over clip and to play a preview of the composite media presentation while scrolling the voice over text.

3. The non-transitory machine readable medium of claim 2, wherein the media editing application determines the size of the representation by automatically calculating an estimated duration based on the received text.

4. The non-transitory machine readable medium of claim 1, wherein the appearance of the voice over clip representation changes in the composite display area upon recording the voice over clip.

5. The non-transitory machine readable medium of claim 1, wherein the voice over tool comprises a text area to receive the text for the voice over.

6. The non-transitory machine readable medium of claim 5, wherein the text area is further to import the text for the voice over.

7. The non-transitory machine readable medium of claim 2, wherein the voice over tool comprises at least one of a first control to specify whether the text scrolls on the text display area, a second control to specify a direction of the scrolling text, and a third control to specify whether to start the scrolling of the text off the text display area.

8. The non-transitory machine readable medium of claim 1, wherein the media editing application executes on a first computing device, wherein the voice over tool comprises at least one option to scroll the voice over text on a second different computing device when recording the voice over clip.

9. The non-transitory machine readable medium of claim 1, wherein the voice over tool comprises a set of selectable items to specify whether to add the voice over clip to an existing track or to add the voice over clip to a new track.

10. A method of providing a media editing application having a graphical user interface (GUI) for creating a composite media presentation from a plurality of media clips, the method comprising:
    providing a set of editing tools to define the composite media presentation that includes a set of media clips;
    providing a composite display area for displaying representations of the clips that are in the composite media presentation;
    providing a voice over tool to receive text for a voice over clip, record the voice over clip, and add the voice over clip to the composite display area, the voice over tool including at least one control for setting a speed at which the text scrolls during the recording of the voice over clip, wherein setting the speed changes a size of a representation of the voice over clip in the composite display area; and
    providing at least one output tool to output the composite media presentation with the set of media clips and the voice over clip recorded with the voice over tool.

11. The method of claim 10 further comprising providing a text display area to scroll the voice over text during the recording of the voice over clip and to play a preview of the composite media presentation while scrolling the voice over text.

12. The method of claim 11, wherein the size of the representation is determined by automatically calculating an estimated duration based on the received text and the speed setting.

13. The method of claim 10, wherein the appearance of the voice over clip representation changes in the composite display area upon recording the voice over clip.

14. The method of claim 10, wherein the voice over tool comprises a text area to receive the text for the voice over.

15. The method of claim 14, wherein the text area is further to import the text for the voice over.

16. The method of claim 11, wherein the voice over tool comprises at least one of a first control to specify whether the text scrolls on the text display area, a second control to specify a direction of the scrolling text, and a third control to specify whether to start the scrolling of the text off the text display area.

17. The method of claim 10, wherein the media editing application executes on a first computing device, wherein the voice over tool comprises at least one option to scroll the voice over text on a second different computing device when recording the voice over clip.

18. The method of claim 10, wherein the voice over tool comprises a set of selectable items to specify whether to add the voice over clip to an existing track or to add the voice over clip to a new track.

* * * * *